(12) United States Patent
Agrawal et al.

(10) Patent No.: US 11,601,391 B2
(45) Date of Patent: Mar. 7, 2023

(54) AUTOMATED IMAGE PROCESSING AND INSIGHT PRESENTATION

(71) Applicant: Snap Inc., Santa Monica, CA (US)

(72) Inventors: Harsh Agrawal, Atlanta, GA (US); Xuan Huang, Redmond, WA (US); Jung Hyun Kim, North Hollywood, CA (US); Yuncheng Li, Los Angeles, CA (US); Yiwei Ma, Los Angeles, CA (US); Tao Ning, Los Angeles, CA (US); Ye Tao, Culver, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/713,020

(22) Filed: Apr. 4, 2022

(65) Prior Publication Data
US 2022/0345435 A1 Oct. 27, 2022

Related U.S. Application Data

(63) Continuation of application No. 16/778,242, filed on Jan. 31, 2020, now Pat. No. 11,297,027.
(Continued)

(51) Int. Cl.
*G06F 3/0482* (2013.01)
*H04L 51/52* (2022.01)
(Continued)

(52) U.S. Cl.
CPC ............ *H04L 51/52* (2022.05); *G06F 3/0482* (2013.01); *G06K 9/62* (2013.01); *G06T 7/0002* (2013.01);
(Continued)

(58) Field of Classification Search
CPC ......... H04L 51/32; H04L 67/42; H04L 51/20; H04L 65/1069; G06T 7/0002;
(Continued)

(56) References Cited

U.S. PATENT DOCUMENTS

| 5,754,939 A | 5/1998 | Herz et al. |
|---|---|---|
| 6,038,295 A | 3/2000 | Mattes |

(Continued)

FOREIGN PATENT DOCUMENTS

| CA | 2887596 A1 | 7/2015 |
|---|---|---|
| WO | WO-2012000107 A1 | 1/2012 |

(Continued)

OTHER PUBLICATIONS

"U.S. Appl. No. 16/778,242, Non Final Office Action dated Jul. 22, 2021", 10 pgs.
(Continued)

*Primary Examiner* — Andrey Belousov
(74) *Attorney, Agent, or Firm* — Schwegman Lundberg & Woessner, P.A.

(57) ABSTRACT

Systems, methods, devices, computer readable instruction media, and other embodiments are described for automated image processing and insight presentation. One embodiment involves receiving a plurality of ephemeral content messages from a plurality of client devices, and processing the messages to identify content associated with at least a first content type. A set of analysis data associated with the first content type is then generated from the messages, and portions of the messages associated with the first content type are processed to generate a first content collection. The first content collection and the set of analysis data are then communicated to a client device configured for a display interface comprising the first content collection and a representation of at least a portion of the set of analysis data.

20 Claims, 26 Drawing Sheets

Related U.S. Application Data

(60) Provisional application No. 62/799,663, filed on Jan. 31, 2019.

(51) Int. Cl.
*G06K 9/62* (2022.01)
*G06T 7/00* (2017.01)
*H04L 65/1069* (2022.01)
*H04L 51/222* (2022.01)
*H04L 67/01* (2022.01)

(52) U.S. Cl.
CPC ........ *H04L 51/222* (2022.05); *H04L 65/1069* (2013.01); *H04L 67/01* (2022.05); *G06T 2207/30168* (2013.01); *G06V 2201/09* (2022.01)

(58) Field of Classification Search
CPC ........ G06T 2207/30168; G06F 3/0482; G06K 9/62; G06K 2209/25
See application file for complete search history.

(56) References Cited

U.S. PATENT DOCUMENTS

| | | | |
|---|---|---|---|
| 6,158,044 A | 12/2000 | Tibbetts | |
| 6,167,435 A | 12/2000 | Druckenmiller et al. | |
| 6,205,432 B1 | 3/2001 | Gabbard et al. | |
| 6,310,694 B1 | 10/2001 | Okimoto et al. | |
| 6,484,196 B1 | 11/2002 | Maurille | |
| 6,487,586 B2 | 11/2002 | Ogilvie et al. | |
| 6,590,586 B1 * | 7/2003 | Swenton-Wall ........ G06F 16/54 715/730 | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,745,186 B1 | 6/2004 | Testa et al. | |
| 6,757,713 B1 | 6/2004 | Ogilvie et al. | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,243,163 B1 | 7/2007 | Friend et al. | |
| 7,278,168 B1 | 10/2007 | Chaudhury et al. | |
| 7,356,564 B2 | 4/2008 | Hartselle et al. | |
| 7,376,715 B2 | 5/2008 | Cunningham et al. | |
| 7,411,493 B2 | 8/2008 | Smith | |
| 7,478,402 B2 | 1/2009 | Christensen et al. | |
| 7,496,347 B2 | 2/2009 | Puranik | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,703,140 B2 | 4/2010 | Nath et al. | |
| 7,912,896 B2 | 3/2011 | Wolovitz et al. | |
| 8,131,597 B2 | 3/2012 | Hudetz | |
| 8,170,957 B2 | 5/2012 | Richard | |
| 8,199,747 B2 | 6/2012 | Rojas et al. | |
| 8,214,443 B2 | 7/2012 | Hamburg | |
| 8,238,947 B2 | 8/2012 | Lottin et al. | |
| 8,244,593 B2 | 8/2012 | Klinger et al. | |
| 8,312,097 B1 | 11/2012 | Siegel et al. | |
| 8,332,475 B2 | 12/2012 | Rosen et al. | |
| 8,570,907 B2 | 10/2013 | Garcia, Jr. et al. | |
| 8,718,333 B2 | 5/2014 | Wolf et al. | |
| 8,724,622 B2 | 5/2014 | Rojas | |
| 8,745,132 B2 | 6/2014 | Obradovich | |
| 8,874,677 B2 | 10/2014 | Rosen et al. | |
| 8,909,679 B2 | 12/2014 | Root et al. | |
| 8,909,714 B2 | 12/2014 | Agarwal et al. | |
| 8,909,725 B1 | 12/2014 | Sehn | |
| 8,914,752 B1 | 12/2014 | Spiegel | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,083,770 B1 | 7/2015 | Drose et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,148,424 B1 | 9/2015 | Yang | |
| 9,191,776 B2 | 11/2015 | Root et al. | |
| 9,204,252 B2 | 12/2015 | Root | |
| 9,225,805 B2 | 12/2015 | Kujawa et al. | |
| 9,225,897 B1 | 12/2015 | Sehn et al. | |
| 9,237,202 B1 | 1/2016 | Sehn | |
| 9,264,463 B2 | 2/2016 | Rubinstein et al. | |
| 9,276,886 B1 | 3/2016 | Samaranayake | |
| 9,294,425 B1 | 3/2016 | Son | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,443,227 B2 | 9/2016 | Evans et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,560,006 B2 | 1/2017 | Prado et al. | |
| 9,628,950 B1 | 4/2017 | Noeth et al. | |
| 9,652,896 B1 | 5/2017 | Jurgenson et al. | |
| 9,659,244 B2 | 5/2017 | Anderton et al. | |
| 9,693,191 B2 | 6/2017 | Sehn | |
| 9,705,831 B2 | 7/2017 | Spiegel | |
| 9,742,713 B2 | 8/2017 | Spiegel et al. | |
| 9,785,796 B1 | 10/2017 | Murphy et al. | |
| 9,825,898 B2 | 11/2017 | Sehn | |
| 9,854,219 B2 | 12/2017 | Sehn | |
| 9,961,520 B2 | 5/2018 | Brooks et al. | |
| 10,345,987 B1 * | 7/2019 | Andreou ............... G06F 3/0488 | |
| 11,297,027 B1 | 4/2022 | Agrawal et al. | |
| 2002/0047868 A1 | 4/2002 | Miyazawa | |
| 2002/0144154 A1 | 10/2002 | Tomkow | |
| 2003/0052925 A1 | 3/2003 | Daimon et al. | |
| 2003/0126215 A1 | 7/2003 | Udell | |
| 2003/0217106 A1 | 11/2003 | Adar et al. | |
| 2004/0203959 A1 | 10/2004 | Coombes | |
| 2005/0097176 A1 | 5/2005 | Schatz et al. | |
| 2005/0198128 A1 | 9/2005 | Anderson | |
| 2005/0223066 A1 | 10/2005 | Buchheit et al. | |
| 2006/0242239 A1 | 10/2006 | Morishima et al. | |
| 2006/0270419 A1 | 11/2006 | Crowley et al. | |
| 2007/0038715 A1 | 2/2007 | Collins et al. | |
| 2007/0064899 A1 | 3/2007 | Boss et al. | |
| 2007/0073823 A1 | 3/2007 | Cohen et al. | |
| 2007/0214216 A1 | 9/2007 | Carrer et al. | |
| 2007/0233801 A1 | 10/2007 | Eren et al. | |
| 2008/0055269 A1 | 3/2008 | Lemay et al. | |
| 2008/0120409 A1 | 5/2008 | Sun et al. | |
| 2008/0207176 A1 | 8/2008 | Brackbill et al. | |
| 2008/0270938 A1 | 10/2008 | Carlson | |
| 2008/0306826 A1 | 12/2008 | Kramer et al. | |
| 2008/0313346 A1 | 12/2008 | Kujawa et al. | |
| 2009/0042588 A1 | 2/2009 | Lottin et al. | |
| 2009/0132453 A1 | 5/2009 | Hangartner et al. | |
| 2010/0082427 A1 | 4/2010 | Burgener et al. | |
| 2010/0131880 A1 | 5/2010 | Lee et al. | |
| 2010/0185665 A1 | 7/2010 | Horn et al. | |
| 2010/0306669 A1 | 12/2010 | Della Pasqua | |
| 2011/0099507 A1 | 4/2011 | Nesladek et al. | |
| 2011/0145564 A1 | 6/2011 | Moshir et al. | |
| 2011/0202598 A1 | 8/2011 | Evans et al. | |
| 2011/0213845 A1 | 9/2011 | Logan et al. | |
| 2011/0286586 A1 | 11/2011 | Saylor et al. | |
| 2011/0320373 A1 | 12/2011 | Lee et al. | |
| 2012/0028659 A1 | 2/2012 | Whitney et al. | |
| 2012/0184248 A1 | 7/2012 | Speede | |
| 2012/0209921 A1 | 8/2012 | Adafin et al. | |
| 2012/0209924 A1 | 8/2012 | Evans et al. | |
| 2012/0254325 A1 | 10/2012 | Majeti et al. | |
| 2012/0278692 A1 | 11/2012 | Shi | |
| 2012/0304080 A1 | 11/2012 | Wormald et al. | |

(56) References Cited

U.S. PATENT DOCUMENTS

| | | |
|---|---|---|
| 2013/0071093 A1 | 3/2013 | Hanks et al. |
| 2013/0124628 A1* | 5/2013 | Weerasinghe ..... G06Q 30/0241 709/204 |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0227602 A1 | 8/2015 | Ramu et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0088332 A1* | 3/2016 | Lind ................ H04N 21/25891 725/14 |
| 2016/0099901 A1 | 4/2016 | Allen et al. |
| 2016/0180887 A1 | 6/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |
| 2017/0289234 A1* | 10/2017 | Andreou ................ G06F 16/739 |
| 2017/0295250 A1 | 10/2017 | Samaranayake et al. |
| 2017/0374003 A1 | 12/2017 | Allen et al. |
| 2017/0374508 A1 | 12/2017 | Davis et al. |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"U.S. Appl. No. 16/778,242, Notice of Allowance dated Nov. 10, 2021", 8 pgs.

"U.S. Appl. No. 16/778,242, Response filed Oct. 22, 21 to Non Final Office Action dated Jul. 22, 21", 9 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (March 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_in_60_seconds>, (Feb. 18, 2015), 4 pgs.

Sawers, Paul, "Snapchat for iOS Lets You Send Photos to friends ans Set How lonf They're Visible For", [Online] Retrieved from the Internet: <URL: https://thenextweb.com/apps/2012/05/07/snapchat-for-ios-lets and-set-how-long-theyre-visible-for/>, (May 7, 2012), 5 pgs.

Shein, Esther, "Ephemeral Data", Communications of the ACM, vol. 56, No. 9 (Sep. 2013), 3 pgs.

Vaas, Lisa, "StealthText, Should You Choose to Accept It", [Online] Retrieved from the Internet: <URL: http://www.eweek.eom/print/c/a/MessagingandCollaboration/StealthTextShouldYouChoosetoAcceptIt>, (Dec. 13, 2005), 2 pgs.

* cited by examiner

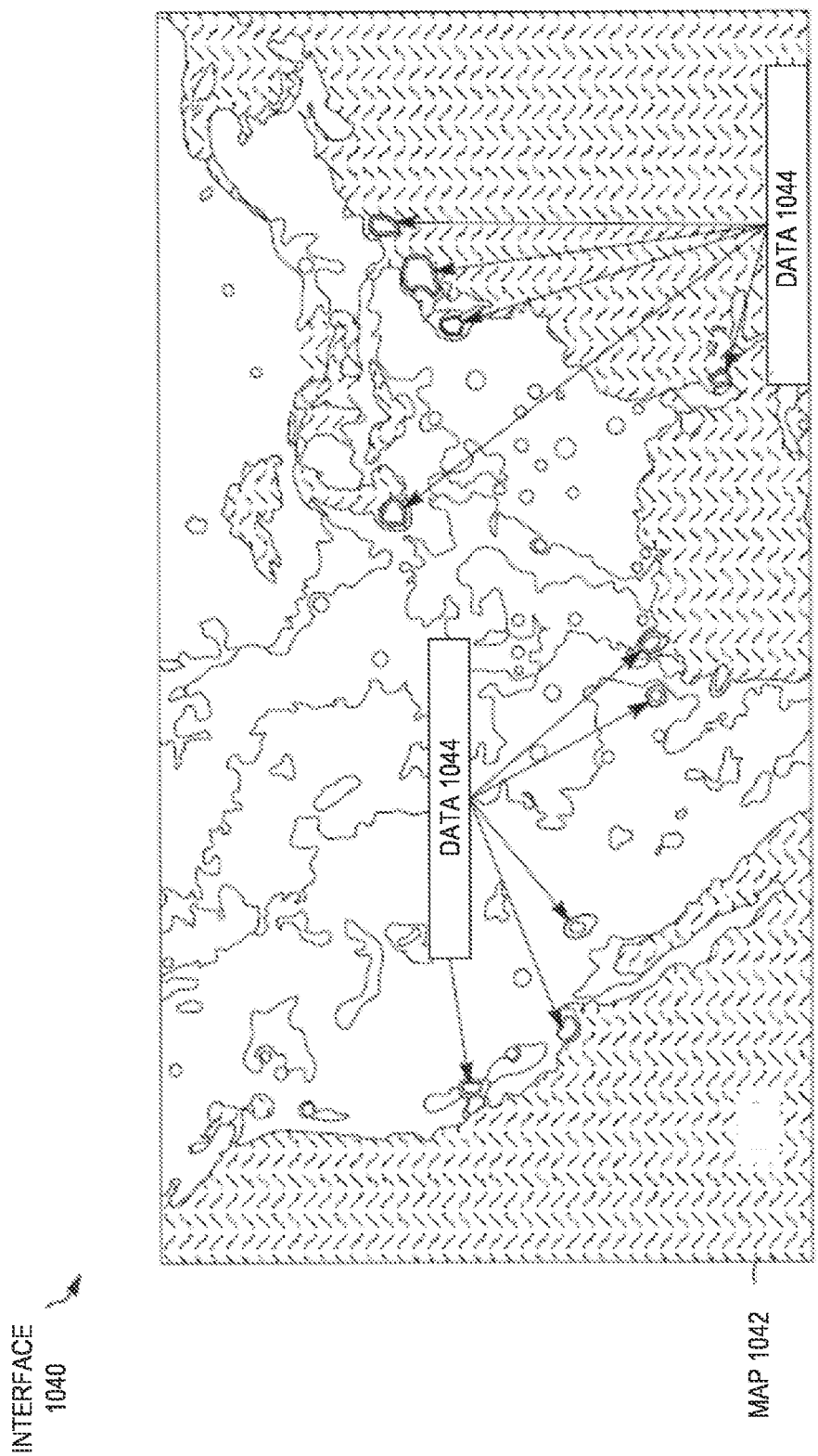

CURATION TEAM

| CURATOR NAME | OLLY DOE |
|---|---|
| EMAIL ADDRESS | OLLY@SC.COM |
| TIME ZONE | WEST COAST ▸ |
| PERMISSION LEVEL | CURATOR |

OLLAY'S STATS

| | |
|---|---|
| 234S | AVG CLEAR TIME (100) |
| 5.6 | AVG FLAGGED (100) |
| 23.4 | FLAGGED : APPROVED SNAPS |
| 23.3M | AVG FLAG WAIT |
| 43.1M | AVG APPROVED WAIT: |
| 14.7M | AVG FLAG/APPROVED SPLIT: |
| 7.1S | AVG TIME BETWEEN FLAGS: |
| 9.7 | AVG /UPDATE |
| 43.3S | AVG UPDATE LENGTH |

OLLY'S ASSIGNED STORIES

| STANFORD (1253) 00:05:53 | SNAPS CLEARED: 255(ME) 12.5K (TOTAL) : LAST UPDATED: 01/12/16 (DIANA DOE) : | + |
|---|---|---|
| PURDUE (253) 00:05:53 | SNAPS CLEARED: 245(ME) 12.5K (TOTAL) : LAST UPDATED: 01/12/16 (DIANA DOE) : | + |
| DUKE (253) 00:05:53 | SNAPS CLEARED: 2135(ME) 12.5K (TOTAL) : LAST UPDATED: 01/12/16 (DIANA DOE) : | + |
| YALE (104) 00:05:53 | SNAPS CLEARED: 255(ME) 12.5K (TOTAL) : LAST UPDATED: 01/12/16 (DIANA DOE) : | + |
| MICHIGAN (104) 00:05:53 | SNAPS CLEARED: 255(ME) 12.5K (TOTAL) : LAST UPDATED: 01/12/16 (DIANA DOE) : | + |
| VANDERBILT (104) 00:05:53 | SNAPS CLEARED: 255(ME) 12.5K (TOTAL) : LAST UPDATED: 01/12/16 (DIANA DOE) : | + |
| BERKELEY (104) 00:05:53 | SNAPS CLEARED: 255(ME) 12.5K (TOTAL) : LAST UPDATED: 01/12/16 (GREG DOE) : | + |
| PUMPKINS (104) 00:05:53 | SNAPS CLEARED: 0(ME) 172.5K (TOTAL) : LAST UPDATED: 01/12/16 (CHLOE DOE) : | + |
| OREGON (1253) 00:05:53 | SNAPS CLEARED: 255(ME) 12.5K (TOTAL) : LAST UPDATED: 01/12/16 (DIANA DOE) : | + |

AUTOMATED IMAGE PROCESSING AND INSIGHT PRESENTATION

CLAIM FOR PRIORITY

This application is a continuation of U.S. patent application Ser. No. 16/778,242, filed Jan. 31, 2020, which application claims the benefit of priority of U.S. Provisional Application Ser. No. 62/799,663, filed Jan. 31, 2019, which is hereby incorporated by reference in its entirety.

TECHNICAL FIELD

Embodiments of the present disclosure relate generally to computing systems and networks for content management and sharing, as well as image processing and user interfaces to identify and organize insight information derived from content shared in a system.

BACKGROUND

Improvements in camera technology and the integration of high-quality image sensors with mobile devices such as smartphones have caused a large increase in the volume of images and image files that a person may interact with and manage. In addition to large numbers of images in personal galleries, users may also have content from other sources on a personal device. Content such as news stories or other collections of live or recent content have traditionally been presented to consumers in a heavily controlled and curated format. Early formats for news presentation included newspapers and magazines. Later formats included broadcast radio and television news. Traditional media and news sources for time sensitive content are typically heavily associated with corporations or well-known persons that gather and present information about current events and happenings. In the modern Internet era, many such news sources have fragmented, but core aspects of information gathering, and presentation often remain associated with professionals gathering and sharing information in a way that is tied to an individual identity.

BRIEF DESCRIPTION OF THE SEVERAL VIEWS OF THE DRAWINGS

FIGS. 10A-F illustrate aspects of operations for presenting insight information gathered from content processed by a system in accordance with some embodiments.

FIGS. 12A-H illustrate aspects of one possible curation tool that can be used with some embodiments.

DETAILED DESCRIPTION

Figure 1:
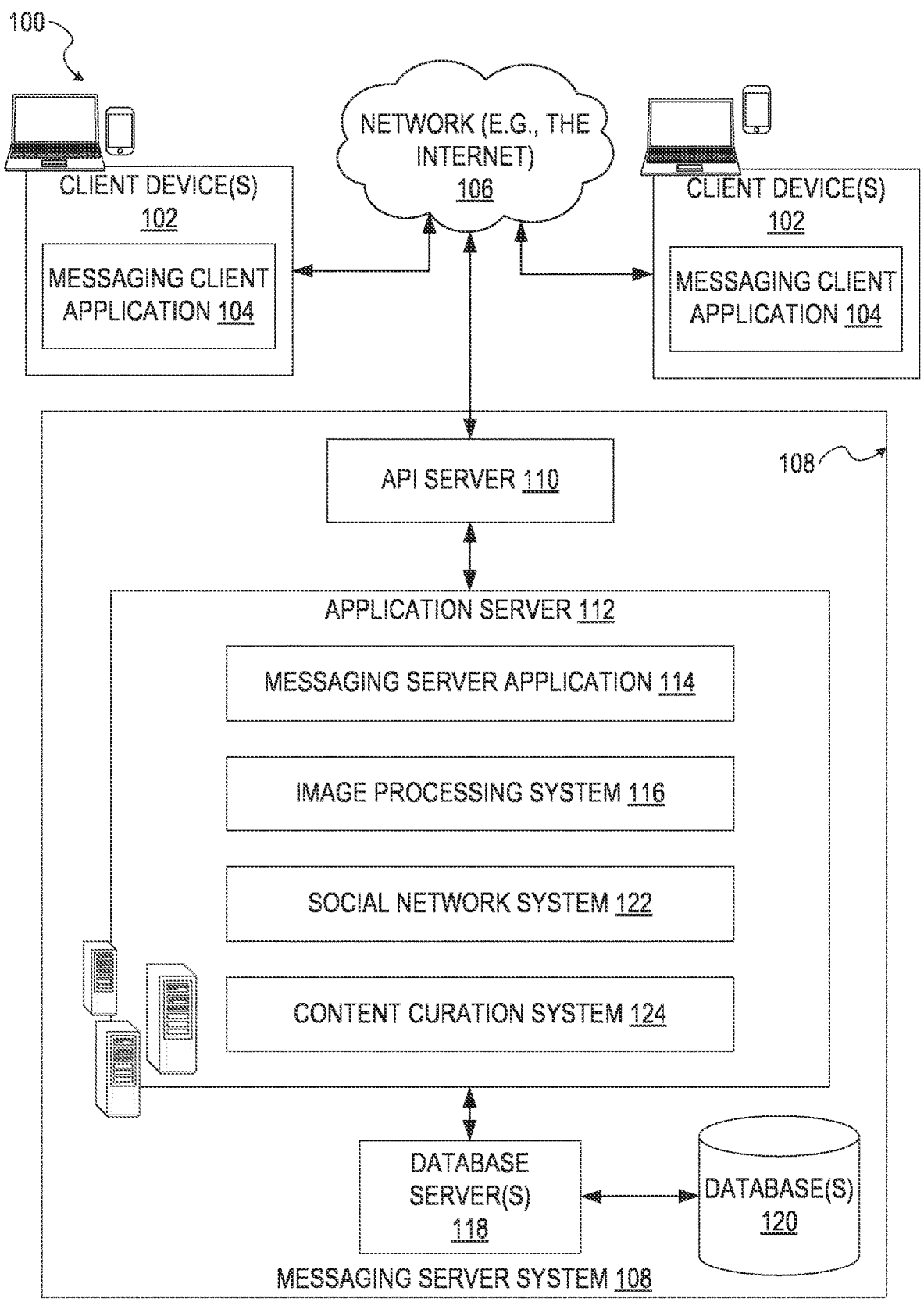
FIG. 1 is a block diagram showing an example messaging system for exchanging data (e.g., messages and associated content) over a network in accordance with some embodiments.

The process for generating content related to news, events, or other information where select professionals filter information and generate a collection of preferred content is time consuming and introduces significant delay between an event occurring and presentation of information to a news consumer. Similarly, individual management of content may overwhelm a user when the amount of content becomes excessive.

Embodiments described herein relate to image processing, machine vision, and content categorization in a communication system, and also to user interfaces for organizing insight information derived from analyzed content in such a system. Some embodiments relate to operations in a social network with content communicated from users to a system server that processes and organizes the received content and can involve the use of machine learning to categorize content, generate metrics for certain content categories, and associate user accounts with certain categories while maintaining user anonymity.

A social network with an ephemeral communication system as described herein can enable communication of content (e.g. images or video clips) or collections of content between users in various ways which may be public or private, and which involves content being automatically removed from the system on a regular basis. In order to track system usage, machine vision can be used to identify content categories or content types (e.g. image subjects such as cats, brand associations, places, etc.) which are represented in images. The system then uses this information in a variety of ways while maintaining user privacy. For publicly posted and available content, user account content associations may be generated. Non-public or ephemeral content may be categorized anonymously as part of a general assessment of system usage without user account content associations. Combinations of such non-public and public information may be aggregated into a user interface to provide insight presentations for particular content categories (e.g. brands, trademarks, topics, areas, etc.)

For example, one or more trademarks or other identifiable patterns may be associated with a content category for Brand A Beverages in a system. When a user posts a content collection with one or more images identified by machine vision as associated with Brand A Beverages, this information is anonymously aggregated, and an anonymous record is kept of metrics for Brand A Beverage (e.g. pieces of content referencing Brand A Beverages, total display time, audience information such as age and city, crossover categories most often present in content with Brand A Beverages references, etc.) For public content, samples of the content may be aggregated into a "highlight" collection while the associated content is public. When an ephemeral trigger causes a particular piece of content included in the highlight collection to be deleted from the system, that piece of content is removed from the highlight collection, and may be replaced with another piece of content referencing Brand A Beverages. An interface may then present a combination of the anonymous metric information and a current highlight collection of public content for Brand A Beverages.

The automatic curation or automated assistance for operators performing curation is described herein. When a piece of content is generated or received, image processing is used to analyze the content. In different implementations this includes analyzing the quality of the content (e.g., blur, contrast, darkness) as well as performing machine vision operations to identify subject matter within the content (e.g., a building, a tree, a person, a car, a logo, a trademark, etc.). These may be represented by one or more quality scores and associated with one or more context values.

Once an individual piece of content has associated context values (e.g. quality scores and content values), the piece of content is stored in a database with the context values, the quality scores, and any other associated metadata (e.g., time, location, ephemeral triggers, filters, etc.) The content may then be added to existing content collections, or analyzed during generation of a new content collection.

For example, a server system may maintain a content collection associated with the topic "dogs." If the piece of content is associated with a context value indicating that a dog was identified from machine vision processing of the image, the piece of content may be associated with this content collection. A system may analyze the piece of content to determine if there is a match with any number of existing content collections.

In another example, additional criteria are analyzed to limit the number of pieces of content for a particular content collection, or to generate collections of content from content within the database. Content age, content quality, distance of a content capture location from a fixed point, or other such data elements may be used to cluster pieces of content into content collections.

For example, a server may periodically receive content containing images of surfers along a particular stretch of beach. When such a picture is received, it is processed to identify that it is an image of an ocean wave with a surfboard, and is stored with a time, location, and a set of image quality scores (e.g. image quality values stored in memory). At a later time, the server may determine that a content collection of surfing for the particular beach is to be generated. Once the available images are identified by topic, the content related to that topic is processed based on the time, location, and quality values for each piece of content associated with that topic to identify content for inclusion in the content collection. A content topic interface may be generated for the topic which includes anonymous metrics for content associated with surfing on the beach, as well as a content collection representative of public content associated with surfing on that beach.

In other embodiments, various other sorting or classification operations are used to define content collections from content received from different users as described herein.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server(s) 118, which facilitates access to a database(s) 120 in which is stored data associated with messages processed by the application server 112.

Dealing specifically with the Application Program Interface (API) server 110, this server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration; login functionality; the sending of messages via the application server 112 from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of a list of friends of a user of a client device 102; the retrieval of such collections; the retrieval of messages and content; the adding and deletion of friends to a social graph; the location of friends within a social graph; opening an application event (e.g., relating to the messaging client application 104).

The application server 112 hosts a number of applications and subsystems, including a messaging server application 114, an image processing system 116, a social network system 122, and an content curation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 (shown in FIG. 3) within the database(s) 120. Examples of functions and services supported by the social network system 122 include the identification of other users of the messaging system 100 with which a particular user has relationships or is "following," and also the identification of other entities and interests of a particular user.

The content curation system 124 provides functionality to process information for content and to match content with collections or to generate new collections. In some embodiments, the content curation system 124 operates as an independent automatic system for machine analysis and generation of content collections. In other embodiments, content curation system 124 uses machine processing to filter content and to provide a limited number of pieces of content to an operator of a curation tool for final selection of the content to be included in a collection. Similarly, some embodiments include a mixture of automatically curated and assisted curation content collections, with interfaces for automatically curated collections to be adjusted by an operator using a curation tool. This may be done, for example, in response to user feedback identifying one or more pieces of content in an automatically curated collection as being identified for review and/or removal from the collection.

The application server 112 is communicatively coupled to a database server(s) 118, which facilitates access to a database(s) 120 in which is stored data associated with messages processed by the messaging server application 114.

Figure 2:
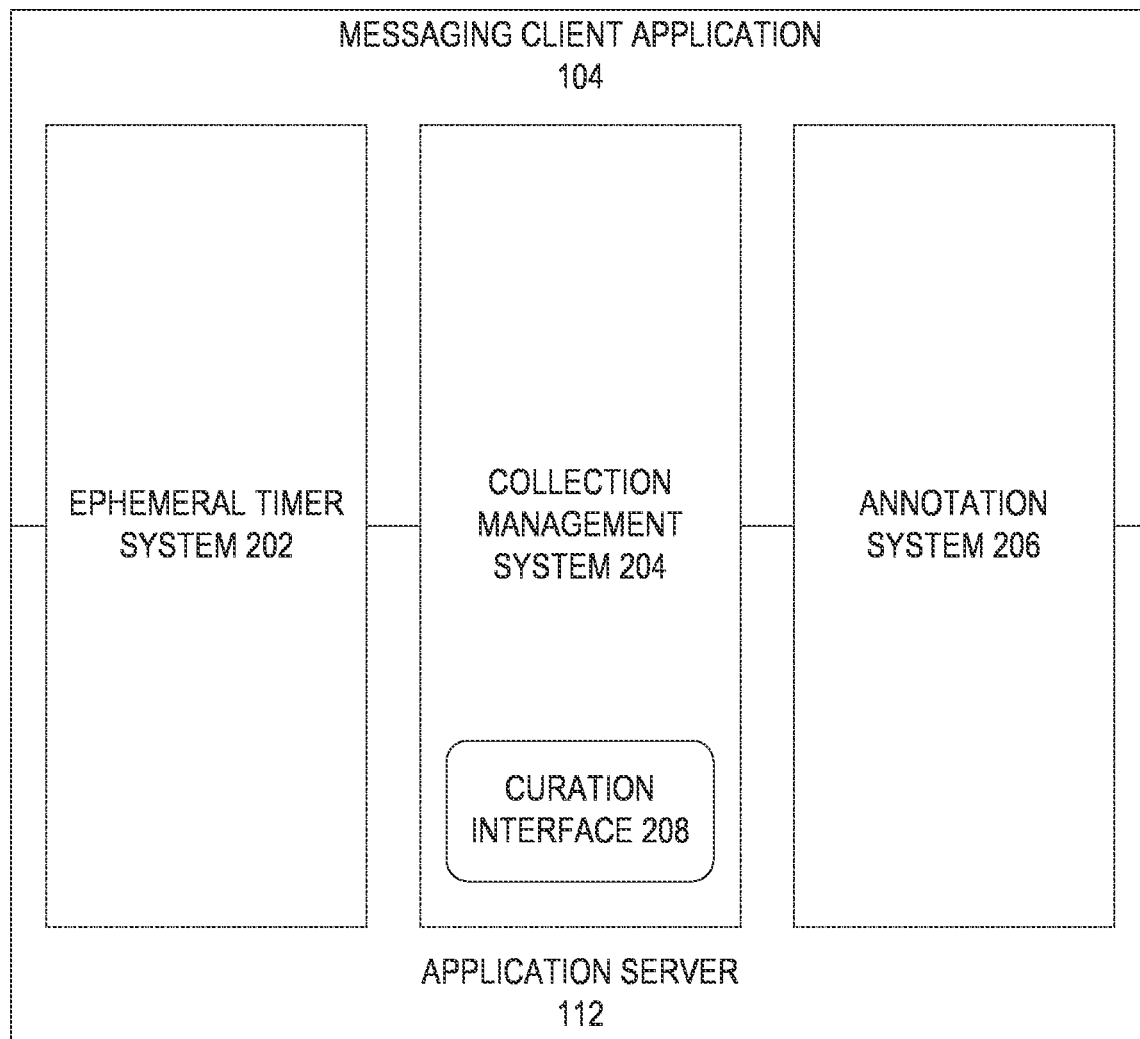
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content. In some embodiments, curation and machine vision operates as described below with respect to FIG. 9.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database(s) 120 and accessed through the database server(s) 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

Figure 3:
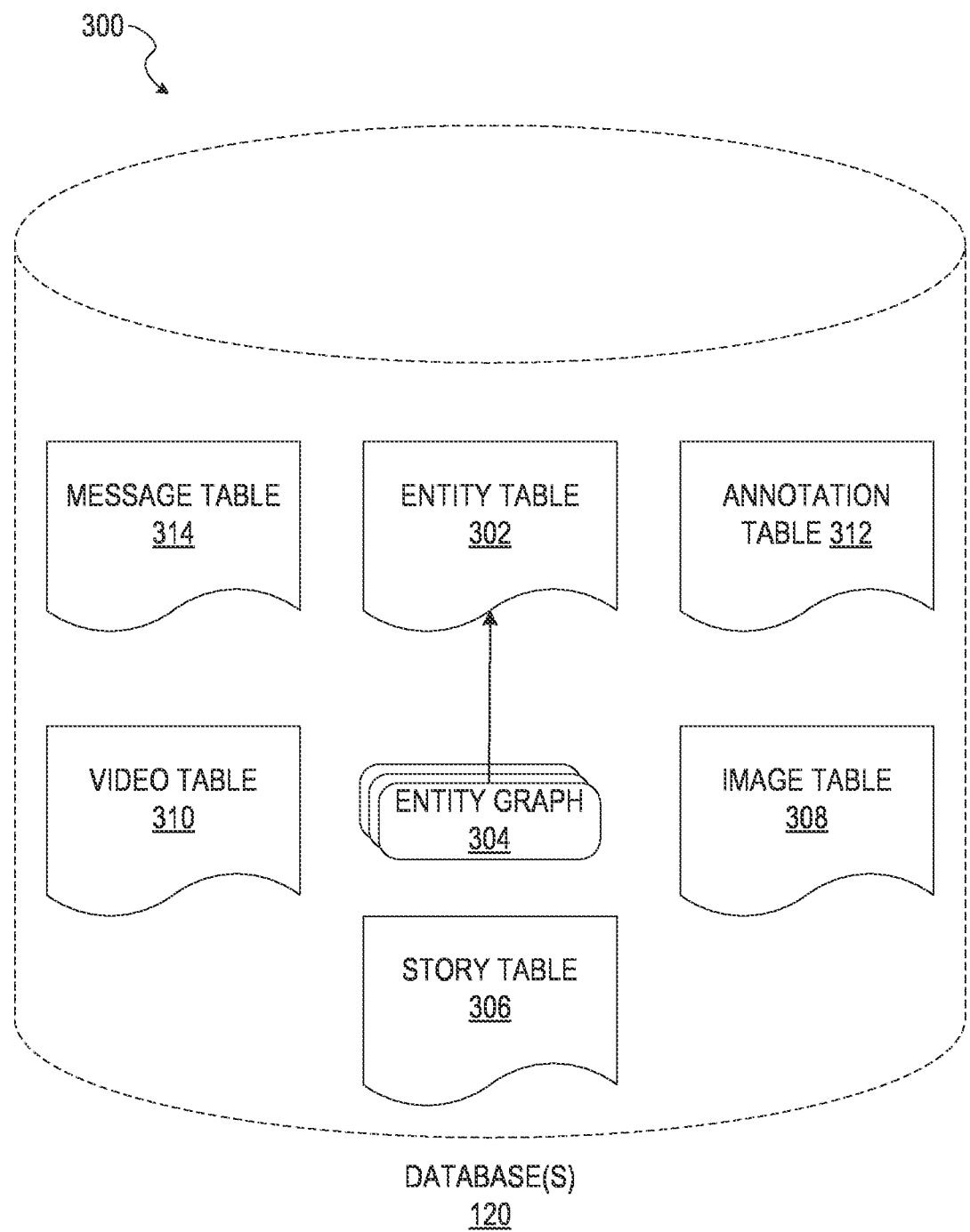
FIG. 3 is a schematic diagram illustrating data which may be stored in the database of the messaging server system, according to certain example embodiments.

FIG. 3 is a schematic diagram illustrating data 300 which may be stored in the database(s) 120 of the messaging server system 108, according to certain example embodiments. While the content of the database(s) 120 is shown to comprise a number of tables, it will be appreciated that the data could be stored in other types of data structures (e.g., as an object-oriented database).

The database(s) 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interest-based or activity-based, merely for example.

The database(s) 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection. The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

Figure 4:
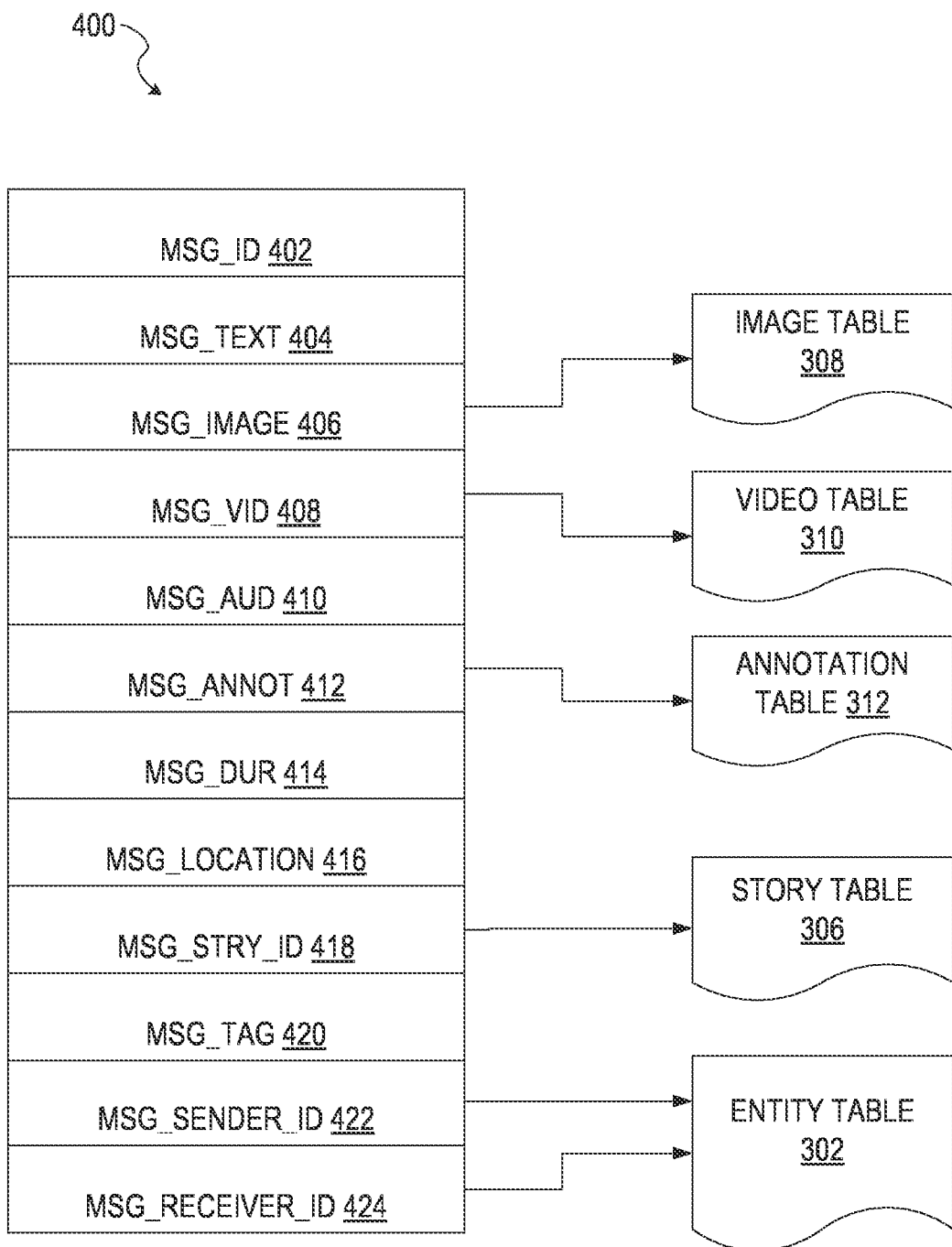
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database(s) 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represent annotations to be applied to message image payload 406, message video payload 408, or message audio payload 410 of the message 400.

A message duration parameter 414: parameter value indicating, in seconds, the amount of time for which content of the message 400 (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, each of these parameter values being associated with respect to content items included in the content (e.g., a specific image within the message image payload 406, or a specific video in the message video payload 408).

A message story identifier 418: values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent.

A message receiver identifier 424: an identifier (e.g., a messaging system identifier, email address or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
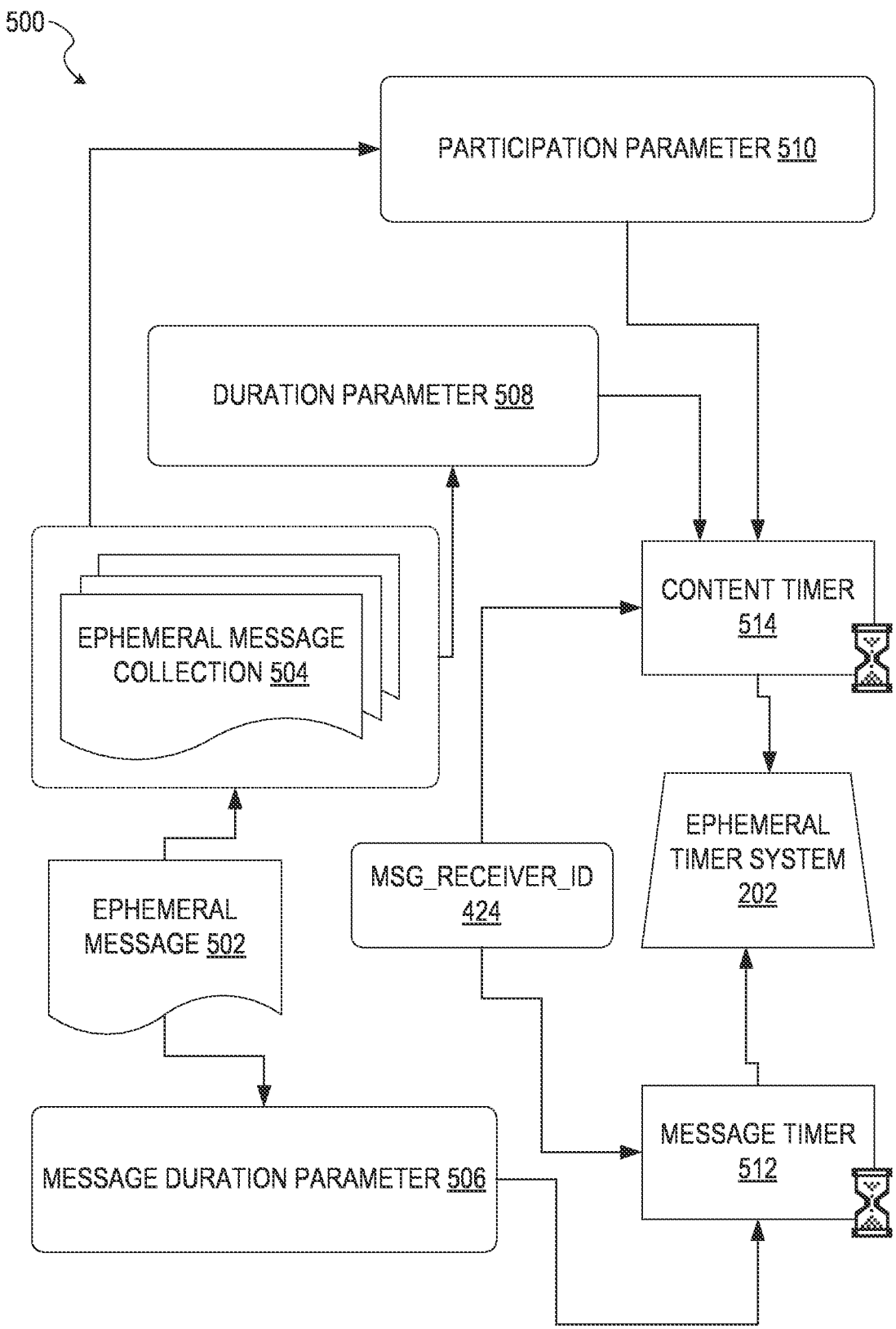
FIG. 5 is a schematic diagram illustrating an example access-limiting process, in terms of which access to content (e.g., an ephemeral message, and associated multimedia payload of data) or a content collection (e.g., an ephemeral message content collection) may be time-limited (e.g., made ephemeral) in accordance with some embodiments.

FIG. 5 is a schematic diagram illustrating an access-limiting process 500, in terms of which access to content (e.g., an ephemeral message 502, and associated multimedia payload of data) or a content collection (e.g., an ephemeral message collection 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an ephemeral messaging application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message collection 504 (e.g., a personal story, a location story, or an event story). The ephemeral message collection 504 has an associated story duration parameter 508, a value of which determines a time-duration for which the ephemeral message collection 504 is presented and accessible to users of the messaging system 100. The story duration parameter 508, for example, may be the duration of a music concert, where the ephemeral message collection 504 is a collection of content pertaining to that concert. Alternatively, a user (either the owning user or a curator user) may specify the value for the story duration parameter 508 when performing the setup and creation of the ephemeral message collection 504.

Additionally, each ephemeral message 502 within the ephemeral message collection 504 has an associated participation parameter 510, a value of which determines the duration of time for which the ephemeral message 502 will be accessible within the context of the ephemeral message collection 504. Accordingly, a particular ephemeral message collection 504 may "expire" and become inaccessible within the context of the ephemeral message collection 504, prior to the ephemeral message collection 504 itself expiring in terms of the duration parameter 508. The duration parameter 508, participation parameter 510, and message receiver identifier 424 each provide input to a content timer 514, which operationally determines, firstly, whether a particular ephemeral message 502 of the ephemeral message collection 504 will be displayed to a particular receiving user and, if so, for how long. Note that the ephemeral message collection 504 is also aware of the identity of the particular receiving user as a result of the message receiver identifier 424.

Accordingly, the content timer 514 operationally controls the overall lifespan of an associated ephemeral message collection 504, as well as an individual ephemeral message 502 included in the ephemeral message collection 504. In one embodiment, each and every ephemeral message 502 within the ephemeral message collection 504 remains viewable and accessible for a time-period specified by the duration parameter 508. In a further embodiment, a certain ephemeral message 502 may expire, within the context of ephemeral message collection 504, based on a participation parameter 510. Note that a message duration parameter 506 may still determine the duration of time for which a particular ephemeral message 502 is displayed to a receiving user, even within the context of the ephemeral message collection 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message collection 504.

The ephemeral timer system 202 may furthermore operationally remove a particular ephemeral message 502 from the ephemeral message collection 504 based on a determination that it has exceeded an associated participation parameter 510. For example, when a sending user has established a participation parameter 510 of 24 hours from posting, the ephemeral timer system 202 will remove the relevant ephemeral message 502 from the ephemeral message collection 504 after the specified 24 hours. The ephemeral timer system 202 also operates to remove an ephemeral message collection 504 either when the participation parameter 510 for each and every ephemeral message 502 within the ephemeral message collection 504 has expired, or when the ephemeral message collection 504 itself has expired in terms of the duration parameter 508.

In certain use cases, a creator of a particular ephemeral message collection 504 may specify an indefinite duration parameter 508. In this case, the expiration of the participation parameter 510 for the last remaining ephemeral message 502 within the ephemeral message collection 504 will determine when the ephemeral message collection 504 itself expires. In this case, a new ephemeral message 502, added to the ephemeral message collection 504, with a new participation parameter 510, effectively extends the life of an ephemeral message collection 504 to equal the value of the participation parameter 510.

Responsive to the ephemeral timer system 202 determining that an ephemeral message collection 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message collection 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
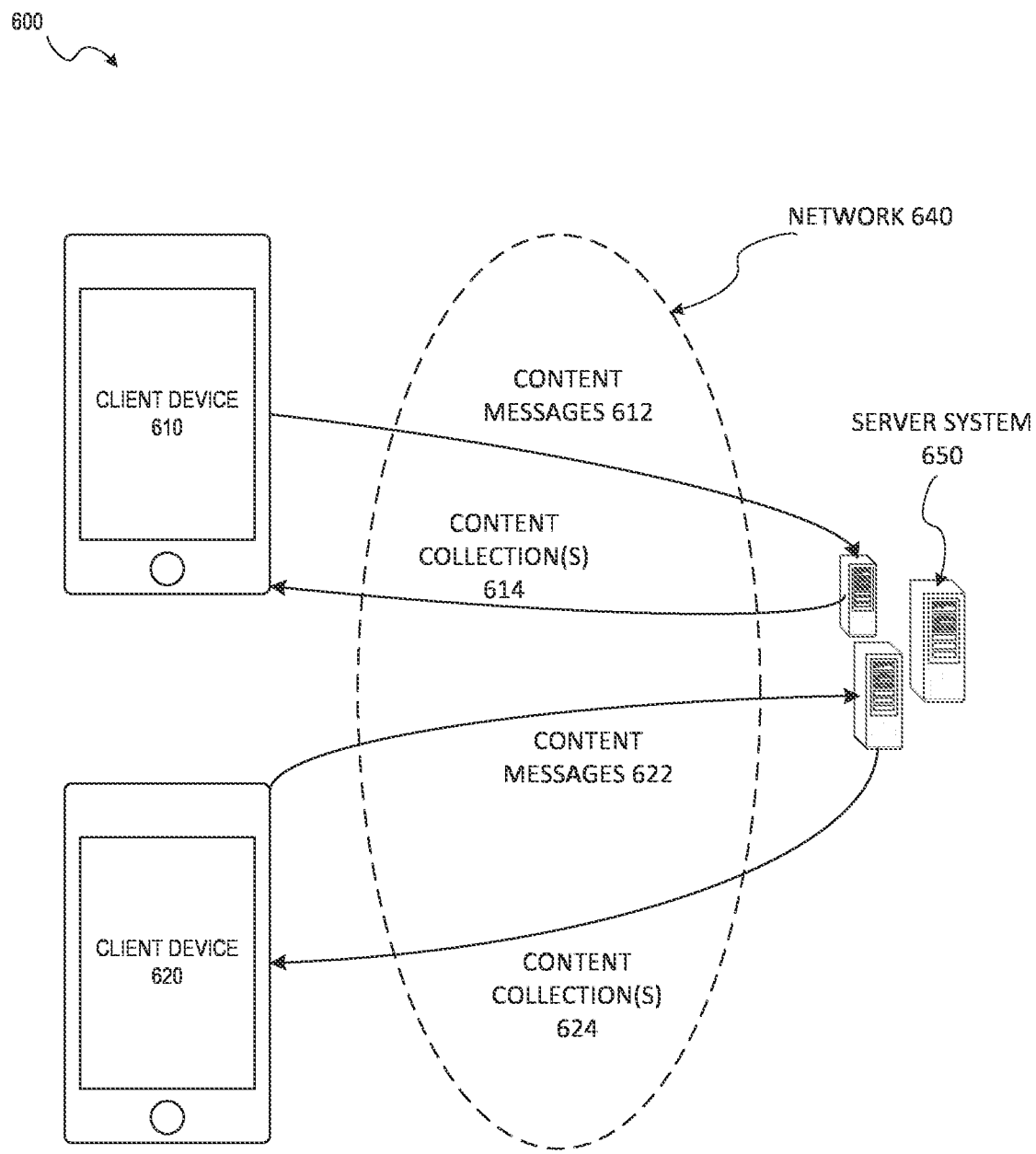
FIG. 6 illustrates a system for communicating content messages and content collections in accordance with some embodiments.

FIG. 6 is a block diagram illustrating a networked system 600, according to some example embodiments. System 600 includes client device 610, client device 620, server system 650, and network 640 that is used to convey communications between client devices 610 and 620 and the server system 650. Client devices 610 and 620 may be any smartphone, tablet, phablet, laptop computer, network-enabled camera, or any other such network enabled device. Client devices 610, 620 may include a camera device for capturing content, or may be coupled to a separate camera device that is used to capture the content prior to sending to other client device 610, 620 for storage. Some embodiments may therefore include wearable devices such as a pendant with an integrated camera that is coupled to a client device 610, 620. Other embodiments may include other associated devices with an integrated camera that may be wearable such as a watch, eyeglasses, clothing such as a hat or jacket with integrated electronics, a clip-on electronic device, or any other such devices that may communicate or be integrated with a client device 610, 620. Client devices 610 and 620 are connected to server system 650 via network 640. The network 640 may include any combination of wired and wireless connections. In some embodiments, client devices 610 and 620, as well as any elements of server system 650 and network 640, may be implemented using elements of software architecture or machine examples described below.

Networked system 600 then may be used in communication of content messages from client devices 610, 620 to a system 650, and communication of content collections from the system 650 to the client devices 610, 620. As shown in FIG. 6, client device 610 communicates content message 612 to server system 650, and client device 610 receives content collections 614 from server system 650. In some embodiments, content message(s) 612 include some or all elements of message 400 described above. In some embodiments, some elements of message 400 are included as part of communication of a content message 612, and another portion of the elements (e.g., story table 306, etc.) are added by server system 650 after the content (e.g., video, audio, text, or other such content elements) of content messages 612 is analyzed by the server system 650. Content messages 612 are thus processed and analyzed by server system 650 to generate content collections in accordance with the details below.

In addition to this functionality, used for the embodiments described herein, client device 610 may additionally receive private pieces of content and communications from other users, and may convey a personal content collection to server system 650, with the personal content collection including images and or video from content messages 612 generated by client device 610 or another device coupled to client device 610. Similarly, client device 620 sends content messages 622 and receives content collections 624, and may additionally perform other actions.

Figure 7:
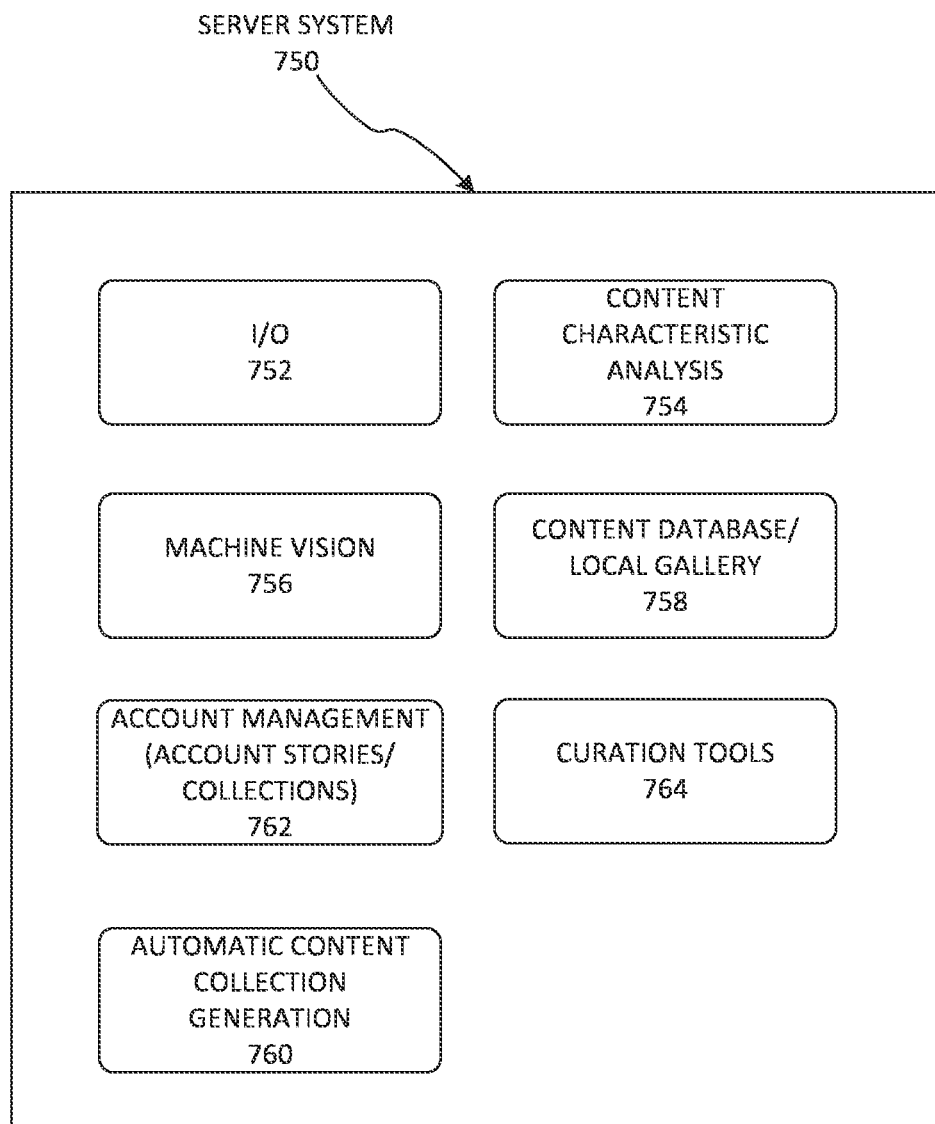
FIG. 7 illustrates aspects of systems and devices for image processing and content curation in accordance with some embodiments.

FIG. 7 illustrates aspects of a server system 750 for automated local content collection generation and curation, according to some example embodiments. In various embodiments, server system 750 may be used as an implementation of server system 650 or application server 112. The example server system 750 includes input and output (I/O) module 752, content characteristic analysis module 754, machine vision module 756, content database 758, account management module 762, automatic content collection generation module 760, and curation tools 764.

I/O module 752 may include any hardware, firmware, or software elements needed to send and receive content and content collections to client devices 102, or 610, 620, via a network. Content characteristic analysis module 754 may include devices, processors, and software to analyze images from pictures and frames of video clips, and then determine content characteristics, including details about when and where a picture or video was generated. In certain embodiments, content characteristic analysis module 754 may be implemented as a plurality of different modules, each analyzing a different content characteristic, including any content characteristic described herein.

Machine vision module 756 describes a module that is used to identify content characteristics based on the content of an image or images in a video. Machine vision module 756 includes hardware, firmware, and/or software for analyzing and understanding content. In one embodiment, machine vision module 756 is associated with a dictionary comprising image and video content values. Objects identified in images of a piece of content and the arrangement of the identified objects therein may be used by machine vision module 756 to select one or more content values from the dictionary as content characteristics. For example, a simple machine vision module 756 can identify a ball in an image, and select the values "ball" and "game" as content characteristics. A more complex module may identify the type of ball as a basketball, and include "basketball" as a characteristic value. A still more complex machine vision module 756 may identify a basketball, a crowd, a court color, and an elevated perspective of the court to identify "professional basketball game" and "basketball arena" as content values for the content. The same complex machine vision module 756 may identify a basketball, a park background, and a concrete court surface and associate "amateur basketball game" and "playground basketball" as content values for the content that is illustrated as an example in FIG. 8. Such content values may operate as context values which are used to generate content collections as described herein. Other types of context values besides such content values, however, may be used to generate content collections without using content values, or in addition to such content values. For example, one embodiment of an image may have associated context data comprising location data (e.g. coordinates or a geofence), time data (e.g. a time of day, a day of the month, an hour, etc.) content values (e.g. trees, basketball court, a face, etc.) quality values (e.g. blur, exposure, brightness, contrast, etc.) or any other such values which are referred to herein as context data.

These content values generated by machine vision module 756 can then be stored in content database 758 along with other characteristic values. Such characteristic values can include: one or more content values (i.e., an identification of what's in the content); a generation time; a generation time period; a generation location; a generation area; one or more quality values; any metadata value associated with content; an identifier for a particular piece of content; or any other such values. In some embodiments, a copy of content may be stored in content database 758 with location information, capture time information, and any other such information about a piece of content. In certain embodiments, content database 758 may anonymously store details about content use. For example, client devices 102, 610, 620 can communicate details about presentation of the content on a screen of the device, and about screenshots taken of the content. Anonymous metrics about how often a piece of content is viewed as part of a content collection, how long the content is viewed for, and how frequently screenshots are taken may then be measured by server system 750, as part of analysis by content characteristic analysis module 754, with the resulting data stored in content database 758. In some embodiments, content database 758 may include this content information with any content or content message information discussed above with respect to FIG. 4 or in any database or table structure discussed above.

Account management module 762 includes application or interface functionality to enable users to manage entity/account relationships via communications between user devices and server system 750. Account management module 762 may also manage an individual user's content collections as described herein.

Curation tools 764 include tools available to system operators or advertisers to generate and present content collections from large amounts of content received at server system 750 and made available by user selection to be included in public content collections (e.g., live content collections, location content collections, content-based content collections, etc.). Similarly, automatic content collection generation module 760 may filter large numbers of received pieces of content to generate content collections grouped by location, time, topic, or on any other such basis. In some embodiments, elements of automatic content collection generation module 760 are used to filter the number of pieces of content provided to curation tools 764 to a smaller number (e.g., filtering 10000 received pieces of content to provide 700 pieces of content to curation tools 764 for review by system operators).

In some embodiments, automatic content collection generation module 760 may then use information about pieces of content from content database 758 to select particular pictures or videos for an automatically generated content collection. In various embodiments, automatic content collection generation module 760 may use complex scoring, weighting, and other rules in generating a content collection. For example, certain embodiments may function such that all pieces of content meet a quality threshold unless a trend having certain threshold characteristics is identified and all content associated with the trend are below the quality threshold. Another embodiment may weight content collection generation based on a number of content collections currently available in a local geographic area. In still further embodiments, any number of complex rules may be applied together as part of content collection generation to filter images and videos for a content collection based on time, location, content, and quality.

In some embodiments, quality scoring within automatic content collection generation module 760 may be used to filter or select pieces of content for a particular content collection and to filter different content collections for presentation to a user. A quality score, in some embodiments, is based on a detailed exposure analysis of an image or a sample of frames in a video clip. For example, a histogram of luminance may be calculated, and a quality may be assigned to the image or video based on a correlation of the histogram with a quality score. Such a correlation may be based on a table or function associating certain histogram patterns with selected quality scores, or may be generated in any other such matters. For video where multiple sample frames are analyzed, an average of scores for each frame may be used to select a score, a worst score for an individual frame of all the analyzed frames may be used, or any such combination or function of multiple scores or selections of scores may be used.

In some embodiments, motion-blur estimation of an image or of selected video clips is used as a part of the quality score. Such motion blur estimation may, for example, be based on a calculation of energy gradients on detected edges, or other such motion estimations. For video clips, identifying video frames with motion blur above a threshold amount may trigger analysis of additional sample frames to determine how much of the video is impacted by motion blur, or to identify when a shakiness of a camera sensor impacts an entire video. In certain embodiments, a system may use a threshold for video motion or "shakiness" to filter out videos with camera motion or shake above the threshold. In other embodiments, a shakiness or motion score may simply modify an overall quality score. In other embodiments, both a hard threshold as well as an input to an overall quality score may be used.

In some embodiments, images or sample video frames may be analyzed for compression artifacts or other image processing artifacts that indicate a lower image quality or errors introduced into an image due to various compression or communication problems. Such artifacts may include image ringing, image contouring, staircase noise along curving edges, posterizing artifacts, or block boundary artifacts. Videos may be analyzed for additional video-based compression artifacts such as block boundary artifacts associated with motion compensation or mosquito noise that may be identified by analysis of selected frames of a video. The presence of such compression artifacts and the intensity of any identified compression artifacts may be used to modify or select a quality score for an image or video clip. In addition to such information loss associated with compression or lossy transmission, images and video frames may also be analyzed for other types of noise. For example, variance in smooth or uniform regions of an image may be analyzed for noise artifacts, such as noise associated with a low quality or malfunctioning camera sensor, low quality or dirty optics of a camera, or any other such source of noise that may lower, corrupt, or modify the data in the image.

Audio data is also used for quality scoring of video clips in some embodiments. In such embodiments, various audio metrics such as dynamic range, noise levels, language clarity or language recognition data, or any other such audio-based information, may be used to select an audio quality score or to impact an overall quality score. Different audio data metrics, in some embodiments, are used based on a determined audio environment. For example, a video clip with speech may be assessed differently than a clip with music, or video clips with different types of music may be assessed differently. Additionally, audio spotting to identify objectionable audio content (e.g., taboo spoken language or explicit music lyrics) can be used for a quality score or a quality threshold flag, in some embodiments.

In addition to quality scores based on image quality, some scores may be based on image content. For example, as mentioned above, image processing may be used to identify objectionable content such as nudity or taboo language within an image or video clip. In some embodiments, a preferred orientation (e.g., landscape or portrait) may be used for quality scoring. Some systems may additionally use image recognition to identify desirable content. For example, in some systems, images of animals or images of objects associated with a party environment are identified as desirable. The presence of such images within video frames or pictures may be used to increase an overall quality score, or to generate a content score.

Feedback or machine learning is used, in certain embodiments, to select or set a quality score. Such systems may use neural networks to extract features identified as preferred or interesting to system users. For example, in some embodiments, images selected by system users for inclusion in one or more stories may be selected for a learning set. Some or all images and video frames from the learning set may have features extracted and analyzed using a feed-forward artificial neural network such as a convolutional neural network to identify desirable elements of the images, and to automatically assign an interestingness score to future images received based on the neural network generated with the learning set. Feature maps used within such neural networks may be based on any analysis metric described herein, including image quality features and image content features. In some embodiments, learnable filters may be selected and automatically updated based on a database of images from image processing services used for content analysis of images or video frames. In other embodiments, any other such sources may be used for learnable filters. Such analysis may be applied to both image elements of content as well as to audio elements of videos.

Other feedback mechanisms may be used in various embodiments. For example, in some embodiments, a content source, user, or account associated with generating an image or video clip may have associated history data. In some embodiments, association of a content source with a history of content selected by system users or associated with high quality ratings may be used as an input to a quality score, or may be used as a quality flag. Various content source metrics such as the quality history, number of images sent, number of system followers or interconnections, or other such metrics may be used.

In some embodiments, multiple different quality scores may be associated with each individual piece of media content, so that an image may have an exposure quality score, a noise quality score, a motion quality score, a compression quality score, a resolution quality scores, an audio quality score, a content score, or any other such separate quality scores. In such embodiments, an overall quality score based on any combination of such individual quality scores may also be provided. Further, as mentioned above, some or all of such quality scores may individually be used to reject certain pieces of media content automatically, with only the images or videos that exceed all thresholds being presented to a system user. Such a system may have any number of thresholds based on separate quality scores or multiple different combinations of different quality scores. In some embodiments, such thresholds may be variable to present a target number of images and/or videos to a system user. Similarly, different types of images or video clips may be assessed differently, such that weights may be applied to different images differently based on content, location, time, proximity in location or time to a holiday or news event, overall environment, or other such information. The metrics and weights for any of the above, in some embodiments, are applied differently to a selfie taken inside than to concert footage taken outdoors at night. Further, aggregated interest and quality scores for complete sets of content collections (e.g., balanced or weighted scoring for pieces of content within a content collection) are used to sort and select content collections for presentation to a user.

Figure 8:
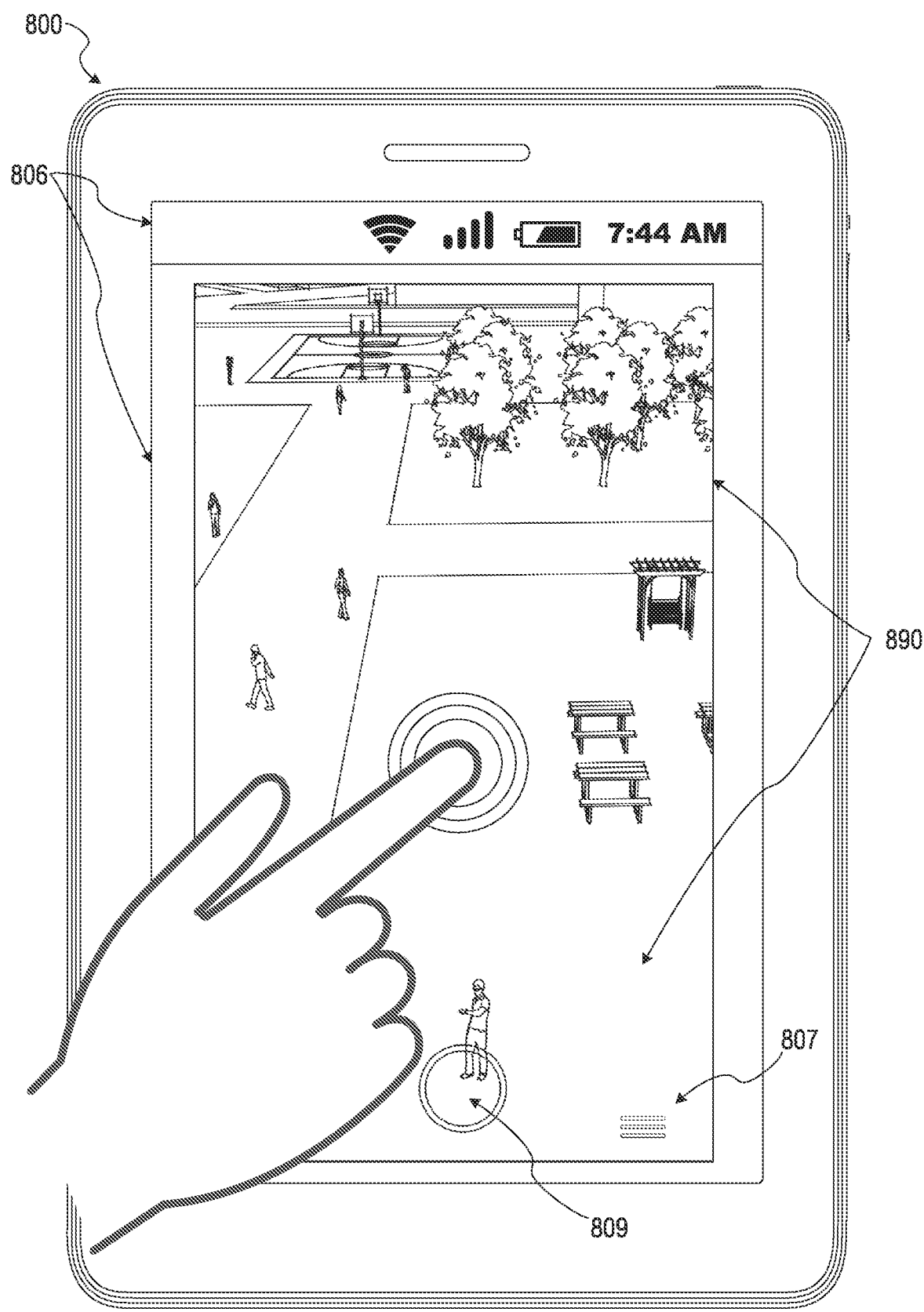
FIG. 8 illustrates aspects of a device for generating and displaying content in accordance with some embodiments.

FIG. 8 shows aspects of a user interface for a message device 800 that may be used as part of a system as described herein. FIG. 8 shows message device 800 with display area 806, which is a touch screen operating as both an output display and an input device. Device 800 may be used to capture content, which is then processed and analyzed as part of curation for a content collection. The content illustrated in display area 806, for example, may be processed by the machine vision module 756 to identify a basketball, a park background, and a concrete court surface and associate "amateur basketball game" and "playground basketball" as context values for the content. Depending on other context values, such as location data, the context may be identified as "school" or "park" or "university".

In addition to various user interface elements, display area displays image 890 (e.g., the image 890 for content generated by the device 800), which includes both image data from a camera of device 800 as well as image capture user interface elements. Interface 807, for example, provides input options to send messages. Interface element 809 may be used to initiate capture of content (e.g., images or video clips) using the camera. Such content may then be analyzed locally as part of local organization or search within a gallery of content stored on the device 800 in accordance with the embodiments described herein. In other implementations, content generated on device 800 is communicated to a server system and analyzed at the server system as part of image processing and content curation operations in accordance with the embodiments described herein.

As described above, the piece of content associated with image 890 is processed in various embodiments and then analyzed as part of automated content curation.

Figure 9:
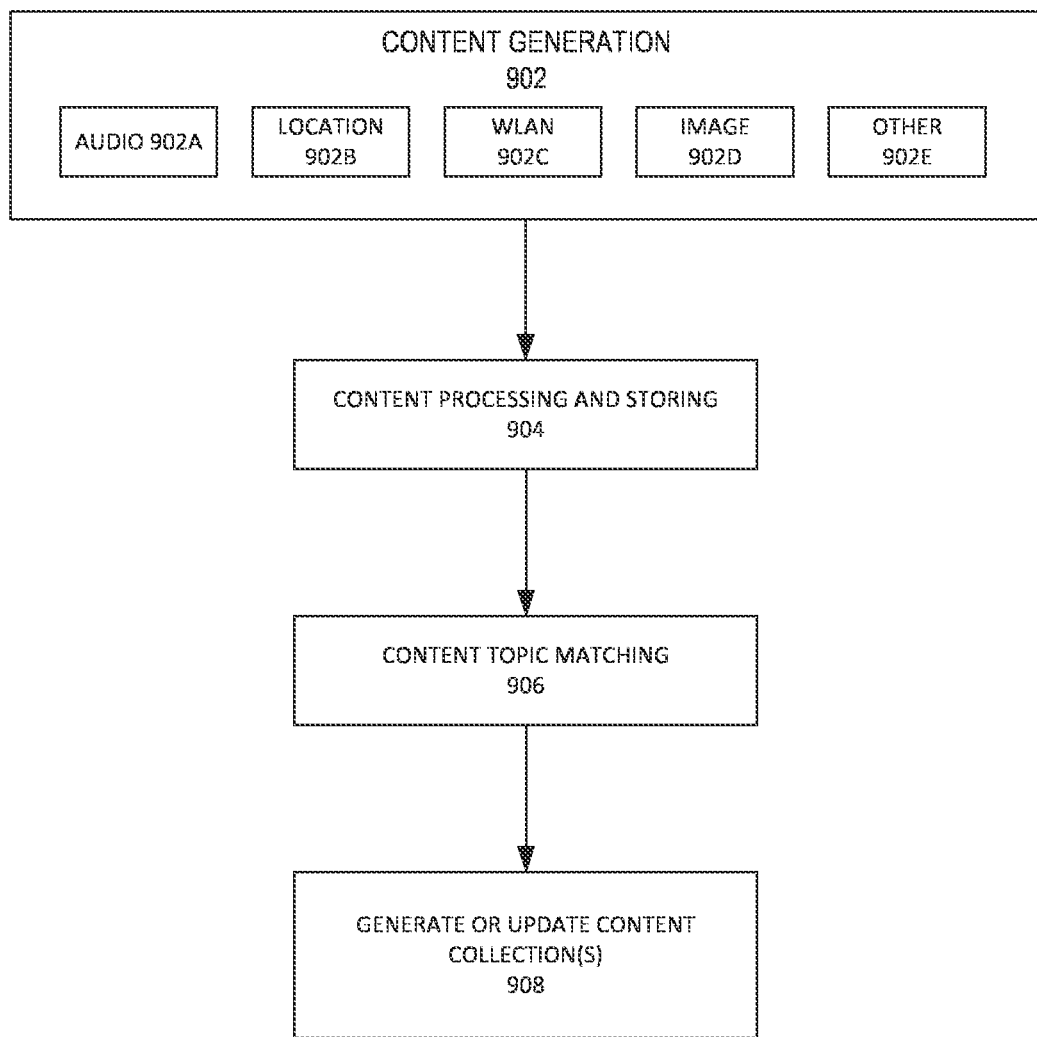
FIG. 9 illustrates aspects of operations for image processing and content curation in accordance with some embodiments.

FIG. 9 then describes aspects of device actions to curate content collections using image processing and image search. In operation 902, content, such as the content for image 890, is captured at a device. The content capture may involve creation of multiple different types of data, including audio data 902A, location data 902B, wireless local area network (WLAN) data 902C, image data 902D, or other data 902E. Audio data 902A may be any data recorded by a microphone at the device, and may include data from sound output by a speaker of the device operation 902. Location data 902B may include any location data from a device, including network assisted location information, global positioning system (GPS) or global navigation satellite system (GNSS) data, accelerometer data, map data, or any other such data related to location and movement of the device performing the content generation. Wireless LAN data may include information about available wireless connections on any number of different wireless protocols, including Bluetooth signals, near field communication signals, Wi-Fi signals operating according to Institute of Electrical and Electronic Engineering (IEEE) communication standards, or any other such signals. For example, in some environments, a business may offer a device access to an access point for network connectivity, with the access point having an identifier that describes the business. The identifier may be used as content metadata, and may be matched to the business name with an associated triggered action as described herein. Image data 902D may be images, video clips, or other information from a camera within the device performing the content capture. Other data 902E may be any information generated by any sensor or I/O component of the device performing the content capture. Such data is then analyzed in any fashion described above, to generate scores and context values for the content. The resulting data is then formatted and stored within a system in operation 904.

As content data and metadata is captured, it may be processed in a number of different ways, and may then be matched against system patterns or topics in operation 906. In some embodiments, for example, a system may have general topics which are used to generate search spaces for content curation. One system may, for example, identify trademarks or brand associations, with each brand association as a separate content topic. Another system may sort content into "object," "life," "sports event," "music event," or "other" topics. Various systems may use any number of such topics or context sorting values. Some systems may include multiple tiers of topics or patterns, where context information is matched to system patterns that are used for content collections.

In some embodiments, this may be as simple as matching content metadata text against a stored text pattern. For example, if an identifier for an access point or a machine vision output includes the word "coffee" and the word "coffee" is a pattern in the system for matching, then a match is identified. Other matches of content data against system patterns may be more complex.

In some embodiments, image search using images from content generation operation 902 is part of an analysis of content data performed to assist with content data pattern matching operation 904. In other embodiments, however, image search and matching with existing content items may be performed automatically with content generation operation 902. The image search operations may be used to enhance the pattern matching performed by a client device working with a server to implement image processing and curation as described herein. Image searching refers to systems which accept images as input, and output related information. In some embodiments, a matching score may be generated and used in any analysis process described herein. Such systems may also return either keyword information describing the information in the image, other similar images, or both. For example, an image search system may accept an image of a cat, and may provide the word "cat" as a response along with other images of similar cats. Some embodiments of image search may include other more detailed information, such as a breed of the cat, a color of the cat, or other detailed information about the environment of the image. Any image processing system described herein may use an independent image search system to process images, generate output information about the images from the search, and store this image search information as context data for a piece of content to be used with content curation.

In operation 908, any match identified during operation 906 may be used to generate or update a content collection. For example, in one embodiment, when generating a content collection based on a particular piece of content, after the content is matched to a topic in operation 904, then all pieces of content within a search space (e.g., within a two mile radius and a two hour time range) are analyzed for similarity using image content (e.g., visual similarity), distance, time, or any other system criteria. If a sufficient number of pieces of content are identified, then a content collection is generated. In some embodiments, if not enough similar pieces of content are found, the criteria for the search space is expanded until sufficient content is identified to generate a collection.

In some embodiments, the criteria within a search space (e.g., different quality or content values) are weighted differently within different topic categories. For example, "life" and "object" content may be matched to content within larger distances. "Object" content may have more strict visual content matching requirements, while "life" content may have more strict time requirements. "Sport event" or "Music event" may have specific time windows and visual match criteria associated with a specific event in a specific place, so that content from a specific event will be matched with content from the same event to generate a content collection for an individual event.

As described herein, such collections generated based on topic matching along with other content data matching may be performed automatically to generate a content collection using machine processing of content. In some embodiments, such an automatically generated content collection can be reviewed and edited after it is presented to some users. In some such embodiments, user feedback on particular pieces of content is used to adjust or update a content collection over time. For example, as new pieces of content are received, the matching process above may be performed, and pieces of content swapped out based on quality scores, user feedback, or any other such system information related to a content collection.

As described above, in some embodiments, information generated by machine learning may be aggregated in various ways for a user interface to present insight information derived from content in a system. FIGS. 10A-F illustrate aspects of an example insight user interface in accordance with some embodiments described herein. As part of gathering data for such a user interface, certain data gathering and analysis operations of a system are targeted to look at aspects of users that are capturing content associated with certain content categories or content types, such as a certain brand, a certain company, or any other such content type or category with the system. Aspects of this data which are public may be shared as part of a content type insight interface (e.g. interface 1000, interface 1040, interface 1050, etc.), and nonpublic aspects of this data are aggregated in an anonymous fashion to generate metrics which are not associated with individual user accounts. In some embodiments, if the source data is not large enough to allow the aggregation to preserve anonymity, certain analysis data can be withheld from an insight interface.

One embodiment can capture the following metrics: pieces of content associated with the category for a given date range; pieces of content by day, week, or month; number of unique users to generated at least one piece of content associated with the category; or a number of pieces of content generated within certain geographic areas within the last month. In other embodiments, other time periods are used or other general criteria. In some embodiments, these combinations are selected to prevent the identification of individual users from the metric data, and may include a threshold to prevent fine-scale targeting of users. For example, metrics may have a minimum number of users, or geographic areas with less than a threshold number of pieces of content can be excluded from the user interface to protect user anonymity. Similarly, if less than a threshold number of unique users appear for certain category, in some embodiments, the user interface will simply identify the numbers below threshold, and will not identify any information associated with those users. In embodiments where the threshold exceeds the present number, certain audience targeting information may be displayed, such as a general age group, or other such information for subgroups of the unique users associated with category for certain time.

In addition to the above described metrics, an insight interface can include display of content from a "highlight" content collection for the category (e.g. content type). This highlight content collection can be curated by a curation tool described herein, or can be automatically generated by processors of a system using quality scores as described herein. The individual pieces of content are selected from the available public content in the category. As ephemeral triggers associated with pieces of content used in the highlight content collections are triggered, the associated pieces of content are removed from the highlight content collection and may be replaced with other pieces of content. The highlight content collection will thus remain updated based on the ephemeral triggers within the system and the privacy settings of users who create content within the system. In one example embodiment, 10 to 15 pieces of content are presented serially with in a highlight window that is part of the user interface, while the other parts of these interface are directed to displaying the anonymous metric data for the category associated with the highlight content collection.

Figure 10A:
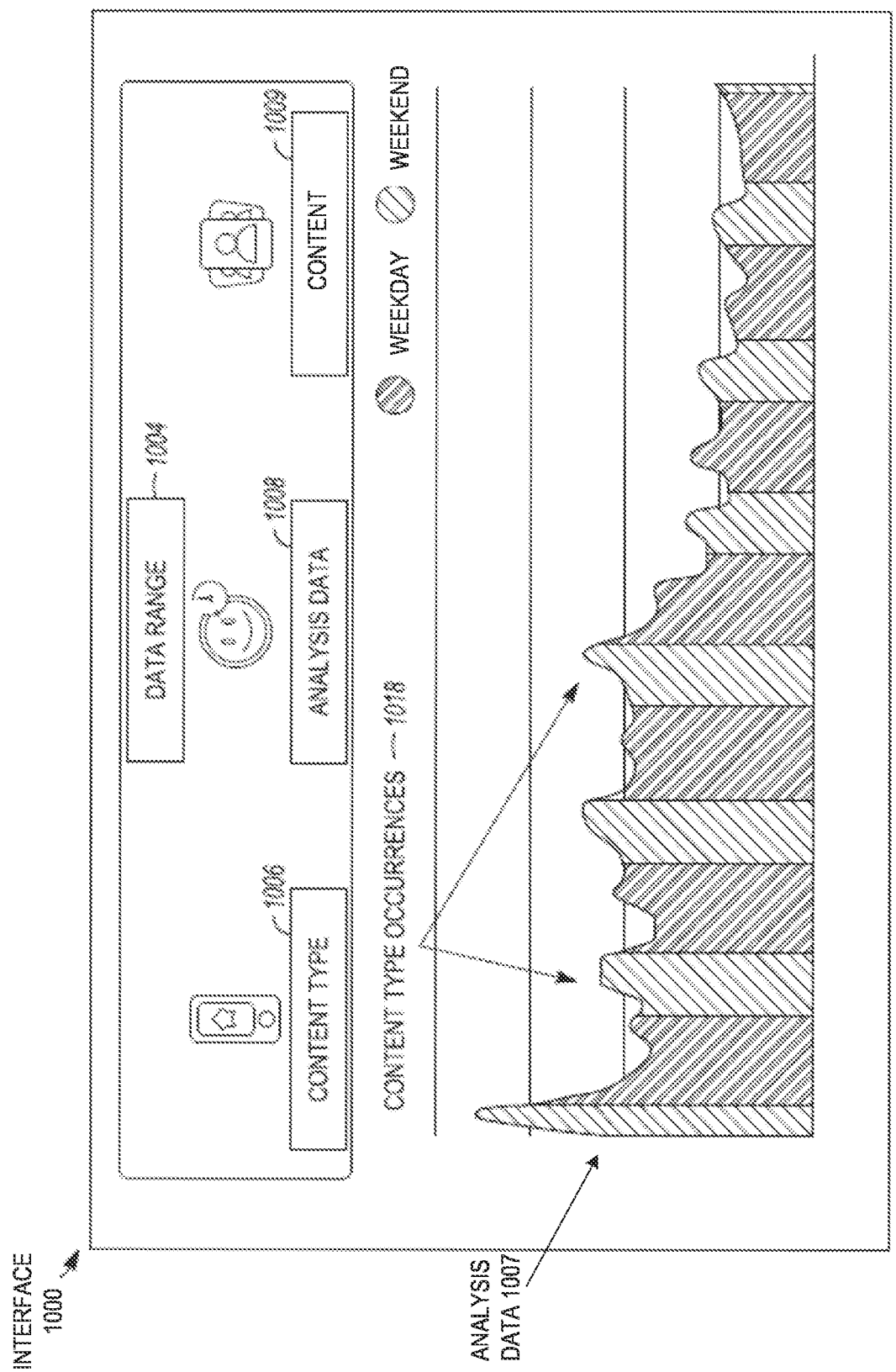

FIG. 10A illustrates an example insight interface 1000 in accordance with one embodiment. Interface 1000 includes date range element 1004, content type 1006 interface element, analysis data elements 1007 and 1008, and content 1009. Content type 1006 can describe the content type (e.g. a brand or a keyword) that insight interface 1000 is presenting. This can include logo images, text associated with the content type, or other such information. The date range element 1004 can be an interface element displaying the times when content used to generate data reflected in interface 1000 was captured, provided to a system, or published in a system. This can include anonymous data about content with ephemeral content timers that have expired, as well as content currently available in the system.

Different types of analysis data can be presented in interface 1000. For example, analysis data element 1007 is a graph of content type occurrences 1018, illustrating the number of times per day that a content type (e.g. a brand instance) is identified within a content message communicated within a system. Other analysis data, such as analysis data element 1008 can include information such as the average number of messages including the content type are sent per month for users that send at least one message with the content type (e.g. analysis data indicating that users sending at least one message including the content type send on average 2.7 messages which include the content type). Another example of analysis data can be the number of users who send at least one message through the system including content identified with the content type 1006, or the number of users in a particular demographic (e.g. location or age) who send at least one message including content identified with the content type 1006.

Further, interface 1000 includes an interface area for presentation of content 1009 that provides examples of how content type 1006 is represented in the system. Content 1009 can be part of a highlight content collection associated with content type 1006. Such a highlight content collection for content type 1006 can be generated automatically using machine vision and automatic scoring, or can be generated using a curation tool.

In some embodiments, the area of the interface 1000 for analysis data includes multiple windows which cycle through multiple different types of data. This can include both analysis data as well as content from a content collection generated to represent the content type as reflected by publicly available content in the system (e.g. pieces of content published to the general public within the system). In some such embodiments, the pieces of content will display sequentially in the content display window, and the user viewing the user interface may select various metrics while the highlight content collection is presented. In some embodiments, selection of an interface element at date range element 1004 will initiate display of an input interface over the basic interface for selecting different time periods for the analysis data. In one embodiment of interface 1000, a user interface for a brand logo category is illustrated as content type 1006. The user interface includes a date range and a number of pieces of content including a brand logo within the selected time period. The user interface also includes a number of unique user accounts associated with content for the brand during that time range, an average frequency with which users that generate content associated with the brand generated such content during the time range, and a chart showing how the frequency of pieces of content associated with the brand have varied over the selected time range.

In some embodiments, the content from a content collection illustrating examples of content type 1006 within the system is generated and presented as a highlight content collection that is fixed based on a current date and time. In other embodiments, the highlight content collection is customized to display only pieces of content occurring within a selected time range. In such embodiments, the highlight content collection may indicate that a highlight is not available from the selected time period if the period is in a time range when most ephemeral messages have been triggered for deletion, or if the number of public pieces of content associated with the category for that time is below a threshold value.

The process for generating a highlight content collection so that content 1009 is presented in interface 1000 may use any operations described herein, and may be customized to complement metrics in the user interface. As part of the structure, a highlight collection may have a set number of slots or a range of slots. Confidence scores may be assigned to each piece of content in the category, and slots for the highlight collection may be filled by pieces of content having the highest confidence score. Pieces of content in the highlight collection will expire automatically if an associated ephemeral trigger indicates that the content is to be removed from the system, but in some embodiments, historical content scoring may be used to inform aspects of the highlight collection, such as a minimum confidence score for any piece of content to be included in the highlight collection. Further, even if a piece of content has not yet reached the end of its retention, it can still be removed from a highlight collection if new pieces of content with higher confidence scores are identified by the system. In some embodiments, a multi-step selection process is used for highlight collection. In such a multi-step process, machine scored pieces of content may be selected in a first step based on respective automatically assigned confidence scores. In a second step, the machine scored pieces of content for a category are presented to an operator in a curation tool with the operator task to select the final highlight collection. In other embodiments, a highlight collection is generated automatically using machine learning and machine scoring, with an operator review or override option to update or change the automatically generated highlight collection.

FIGS. 10C-F show additional analysis data details that can be presented in other interfaces connected to an initial interface. Such interfaces can illustrate metrics which may be available in the user interface in accordance with embodiments described herein. FIG. 10B includes interface 1040 showing map 1042 as a heat map with occurrence data 1044 showing density of content type message locations for a content type associated with interface 1040. Such maps may be used to illustrate general geographic activity without making specific locations for individual pieces of content available via the user interface. The use of heat maps in particular may provide a quick impression of activity locations in a user interface with a highlight collection being displayed, or with any other preferred metric information. In some embodiments, an interface such as interface 1000 can include an icon indicating a map interface such as map interface 1040 in an interface area or as analysis data which is selectable to provide a direct link to the map interface 1040 from an interface 1000.

Figure 10C:
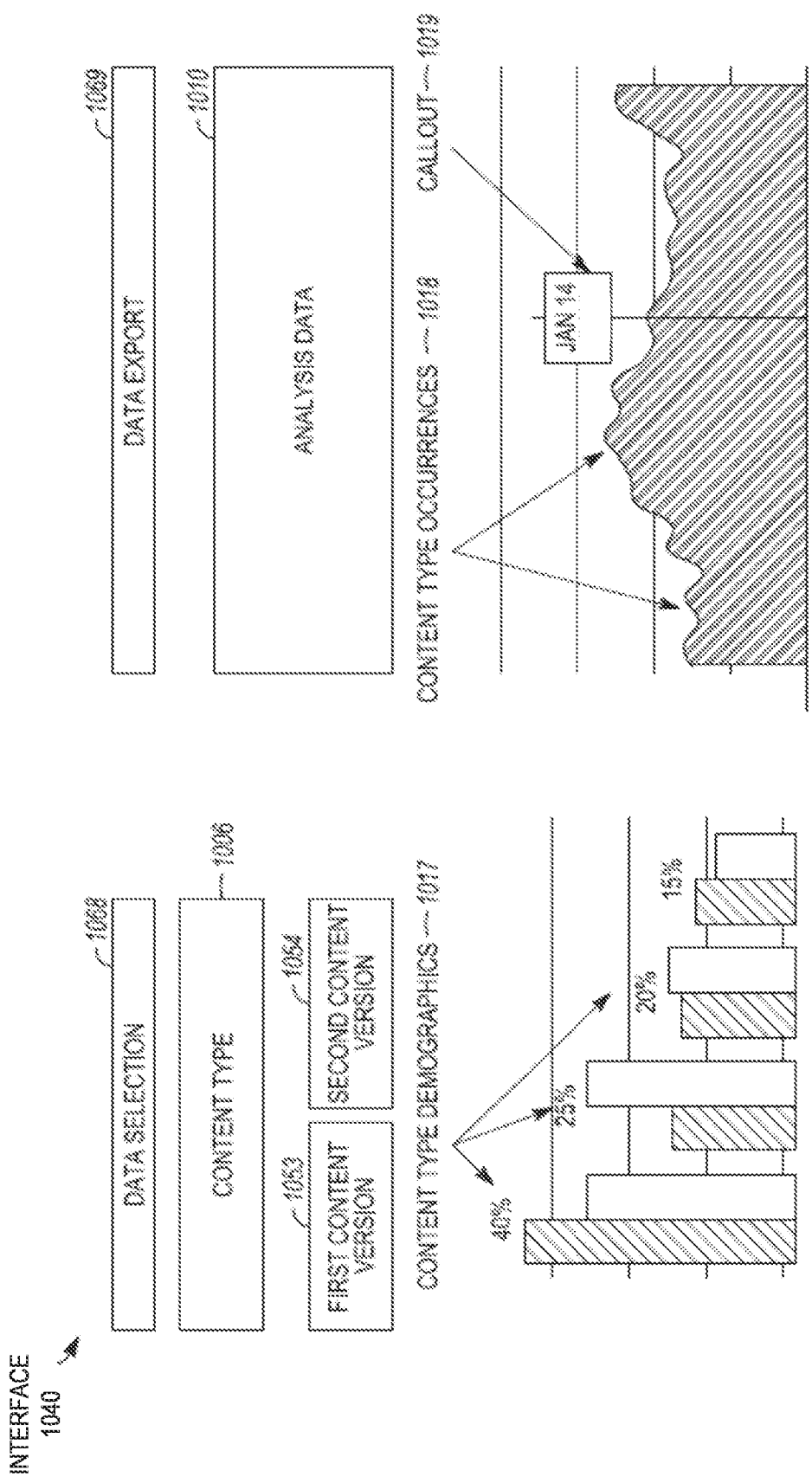
Figure 10D:
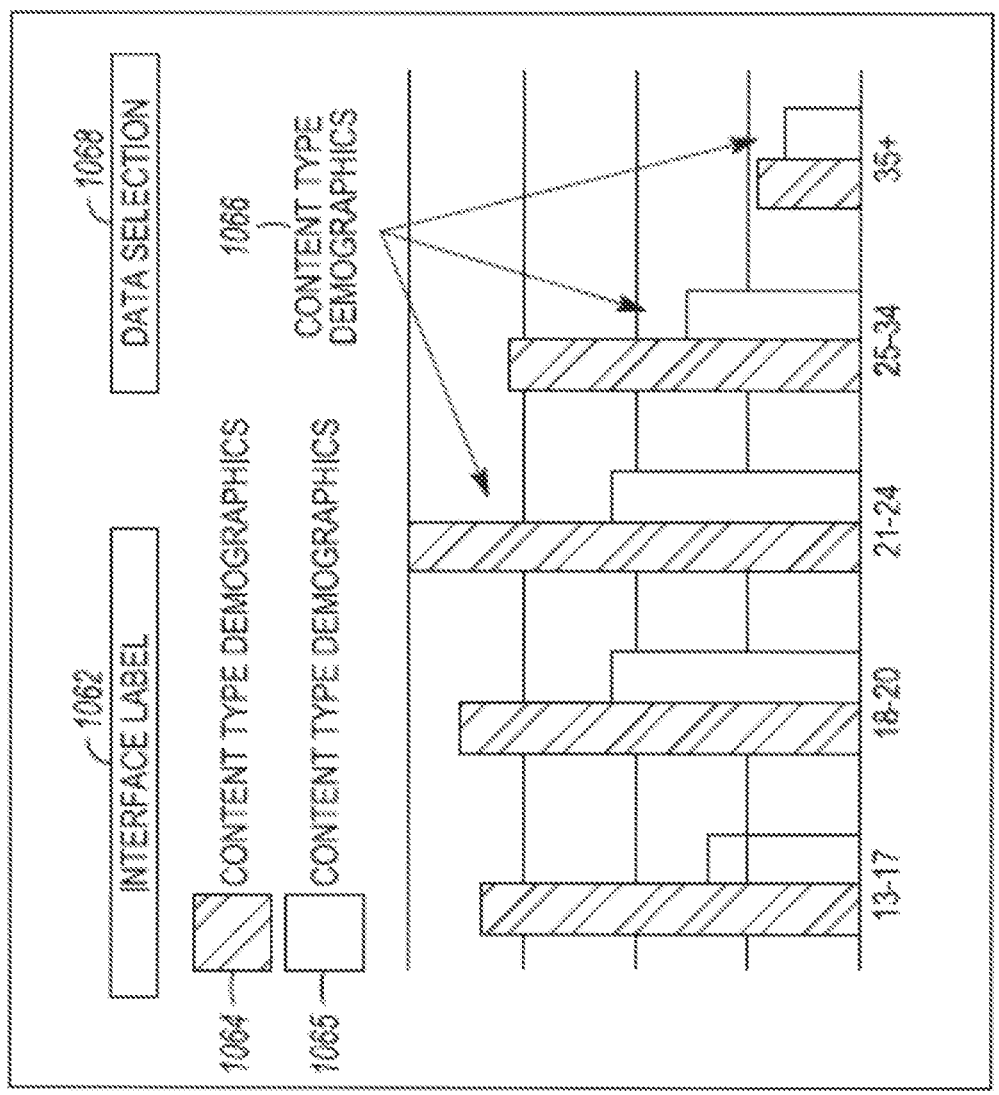

The interface of FIGS. 10C-D show interfaces with a breakdown of user account demographics for users associated with categories during a presented time range. FIG. 10D shows interface 1050 with a breakdown by age and activity over time for a selected time range, in addition to the overall numbers for social media mentions and pieces of content. This content type demographics data 1017 and content type occurrences 1018 with callout 1019 are the analysis data associated with an option selected in data selection element 1068. The content type 1006 is shown or described in one interface element, and interface area 1010 can include particular analysis data or content from a representative content collection associated with content type 1006. As described above, in some embodiments, various different analysis data or content can cycle through interface area 1010 or other areas of FIG. 10D. Additionally, content type 1006 can be associated with different versions of the content type. For example, first content version 1053 associated with content type 1006 can be a logo or product. Second content version 1054 associated with content type 1006 can be a phrase, corporate name, or other string of text associated with content type 1006. For example, content type 1006 can be a brand A beverage, first content version can be a picture of a bottle of brand A beverage, and second content version 1054 can be text or a name associated with brand A beverage.

Interface 1050 includes an interface element data export 1069 for exporting data from interface 1050. In embodiments where the data displayed in interface 1050 includes ephemeral content, such content can be excluded from the export data, and can include a notice of exclusion or a link to an updated version of the highlight content collection with ephemeral content selected for the highlight content collection as an update as content timers expire for certain content and new content is added to the highlight content collection.

FIG. 10D also includes an interface 1060 with a demographic breakdown for data selected using data selection element 1068 and interface label 1062. Selection of a particular setting using data selection element 1068 results in an interface label 1062 being presented with content type demographics 1064, 1065, and 1066. In one embodiment, interface 1060 includes gendered demographic data. In some embodiments, content type demographics 1066 describes interactions with content associated with a content type by age range and gender. In some embodiments, aspects of this metric data can be temporarily written to a user profile and then aggregated for the insight data illustrated in the figures. In such embodiments, when a user communicates content or publishes content in the system associated with category, a temporary affiliation value may be automatically generated and assigned to a user profile. This temporary (e.g. ephemeral) affiliation value may then be used in various ways within the system to provide benefits to system users. In some embodiments, the pieces of content that give rise to these associations are not used to train models or retained beyond an ephemeral trigger in order to maintain the privacy of the users. The affinity value may have the same ephemeral trigger as the associated content, or may have a slightly extended ephemeral trigger (e.g. 30 days). Depending on the structure of the user account, the temporary affiliation may simply be a binary indication, or it may be an affinity score between a user and a category which fluctuates over time based on how often a user generates content associated with category or otherwise interacts with content or other accounts associated with the category. Such affinities or affinity scores may also be used to infer other categories in the system such as groups of categories which are seen to occur together regularly within the system. The data for the affinity scores may be gathered and used in a variety of different ways depending on the particular ephemeral triggers within a system. In some embodiments, content is logged prior to the ephemeral trigger for the associated content, and the affiliation associated with the content generates a new trigger for threshold time beyond the ephemeral trigger. For example, in some systems, content may be removed after 24 hours based on ephemeral trigger for the content, but an affinity value or impact on an affinity score may continue for 30 days past the ephemeral trigger. As mentioned above, the content is not stored past a time associated with the ephemeral trigger for the content, but in some systems the affinity impact generated by the content does persist for a longer period. The affinity scoring may then be used to create reports of category affinities organized by demographics and geographic dimensions.

Figure 10E:
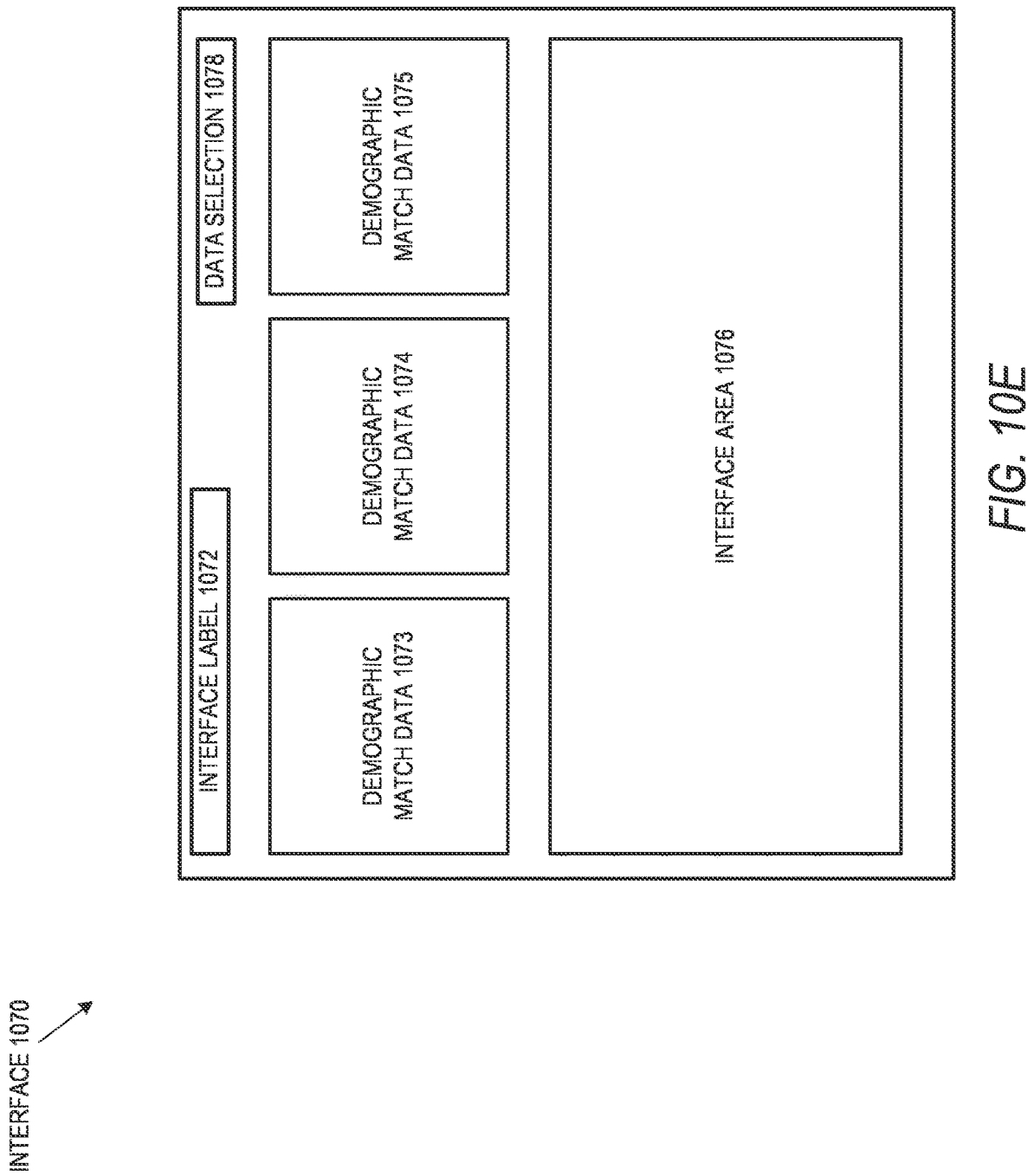

Other embodiments can include not only demographic dimensions, but also associated other categories or user attributes (e.g. lifestyle categories) seen together with the selected category. FIG. 10E illustrates an interface 1070 where data selection element 1078 elects an interface label 1072 and insight presentation for demographic match data describing associations between a selected content type and other content types. Selecting such a setting in data selection element 1078 can present multiple instances of demographic match data 1073, 1074, and 1075. For example, for an interface 1070 associated with a content type of brand A beverage, demographic match data 1073 can show a match with sporting events, demographic match data 1074 can show a match with animals, and demographic match data 1074 can show a match with a particular geographic area. If additional matches or overlap between multiple content types (e.g. brand A beverages and sporting events) are present, the interface 1070 can cycle through interface elements displaying the information, or can include different arrangements of interface elements to show additional information. In some such embodiments, interface area 1076 can show content illustrating the overlap of different content types (e.g. a sports player drinking brand A beverage). In such systems, content collections can be generated for each combination of two or more content types, or a single content collection can be generated representing all the different content type matches illustrated in interface 1070. Such content type matching metrics may be generated using affinity scores in user accounts, as detailed above. For example, when a brand logo is seen in a piece of content with a particular type of music, or with another brand logo, this information may be written into a user profile with a temporary affinity value, and the affinity values for all users aggregated into a list of the most related categories in an insight presentation user interface, as illustrated.

Figure 10F:
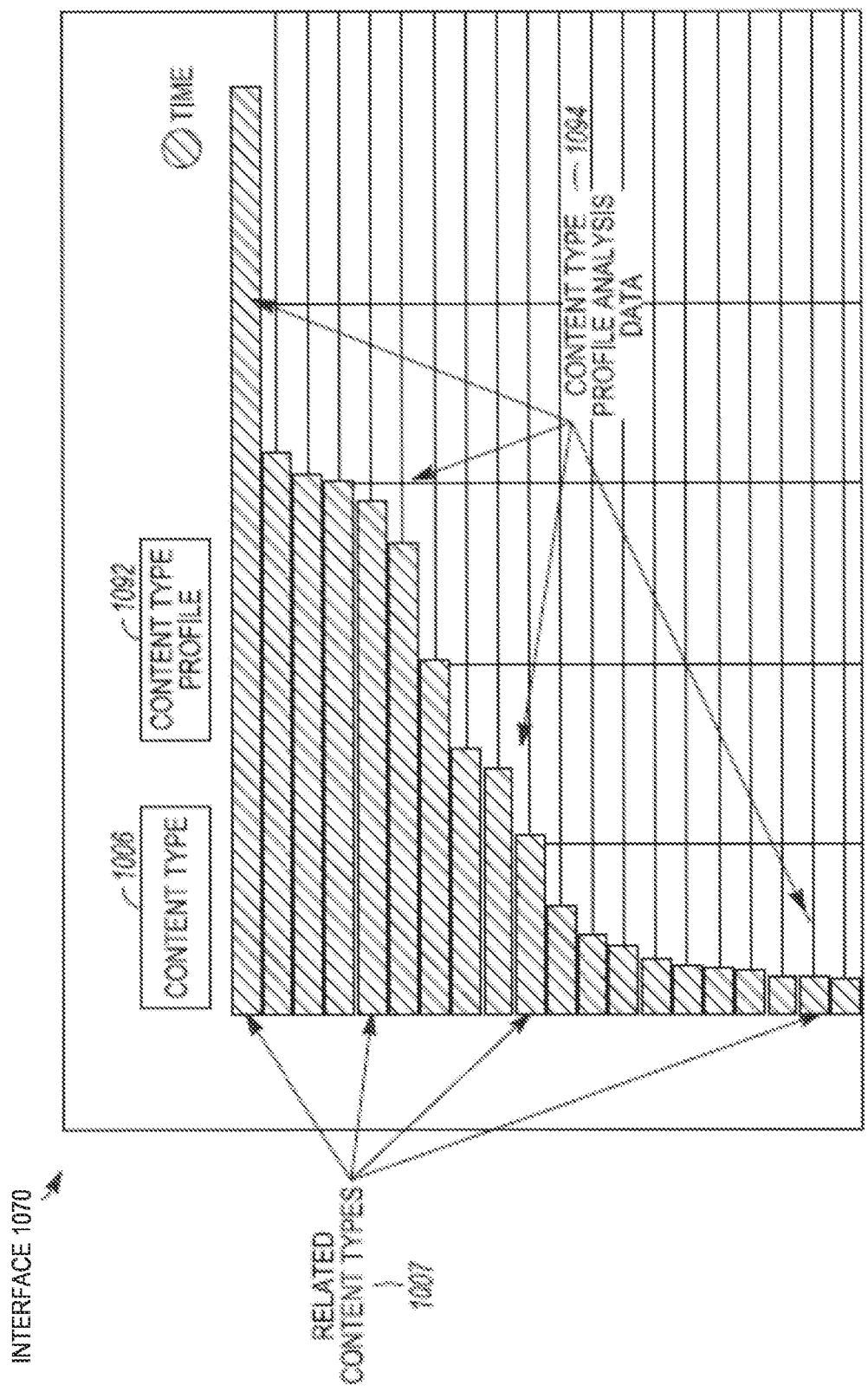

FIG. 10F then further illustrates an interface 1090 with metrics across multiple content type 1097. Interface 1090 includes a content type 1006 identifying the content type primarily associated with the impression data presented as part of interface 1090. Interface 1090 also includes a content type profile element 1092 with additional information about the impression for the selected content type 1006. The chart below then includes engagement data for different content types the content types 1097 can be selected by a system user who chooses particular related content types for comparison, or can be provided automatically be a machine analysis of similar content types or by content types selected as similar by an administrator using a curation tool. Each of the different content types 1097 is associated a value for content type profile analysis data 1094. This can, for example, be a time that an average user interacts with or views content including the associated content type of content types 1097. This can also include a calculated engagement score or other such values for all users or selected demographics. In some embodiments, if a particular selected demographic segment has less than a threshold number of associated system users, the interface 1090 will display a null value or an insufficient data message. Such messages can be created with a threshold selected to protect the anonymity of user accounts, which can be lost if the number of users in a demographic segment is too low.

In some embodiments, as pieces of content from various ephemeral content messages are analyzed to identify categories associated with the content, the extracted categories can be added to a category profile section of the user's profile and a sentiment score may be derived based on the information in the user's profile. In some embodiments, such operations are only applied to a set of white listed categories to limit the information associated with the user account. This information may be used for a combination of recommendations for individual user accounts, and anonymous metric generation for groups of system users. For individual users, other categories or associations may be inferred based on the changes to the user profile. Such information may similarly be used for semi-anonymous look-alike information presentation within the system. For a higher level perspective, aggregated reports of user brand affinities may be generated, and engagement or "time spent" metrics generated for comparisons across different categories.

In some embodiments, only specific categories (e.g. specific brands or trademarks) are incorporated in a system, such that a system may generate user interfaces for insight information for targeted topics or categories, while ignoring related topics. In other various embodiments, context information is structured in different ways, with any number of values for time, location, distance from a target, account information associated with a device that generated the content, audio content, complex "interestingness" scores, or any other such information used as context information. Similarly, any number of quality metrics such as brightness, contrast, saturation, blur, noise quality, audio speech clarity, or other values may be identified and analyzed as part of the image processing and content curation described herein.

In some embodiments, context information such as an "interestingness value" is generated using a neural network generated using a training set of content messages identified as interesting within the server computer system. In some embodiments, this involves the use of convolutional neural network with a feature map including a set of content features and a set of quality features. In other embodiments, data includes feedback messages from users rating selected content messages. Such ratings may be received after the content collection including the content messages has been sent to some users. Such ratings may also be part of any other access system where content is available to users.

Figure 11:
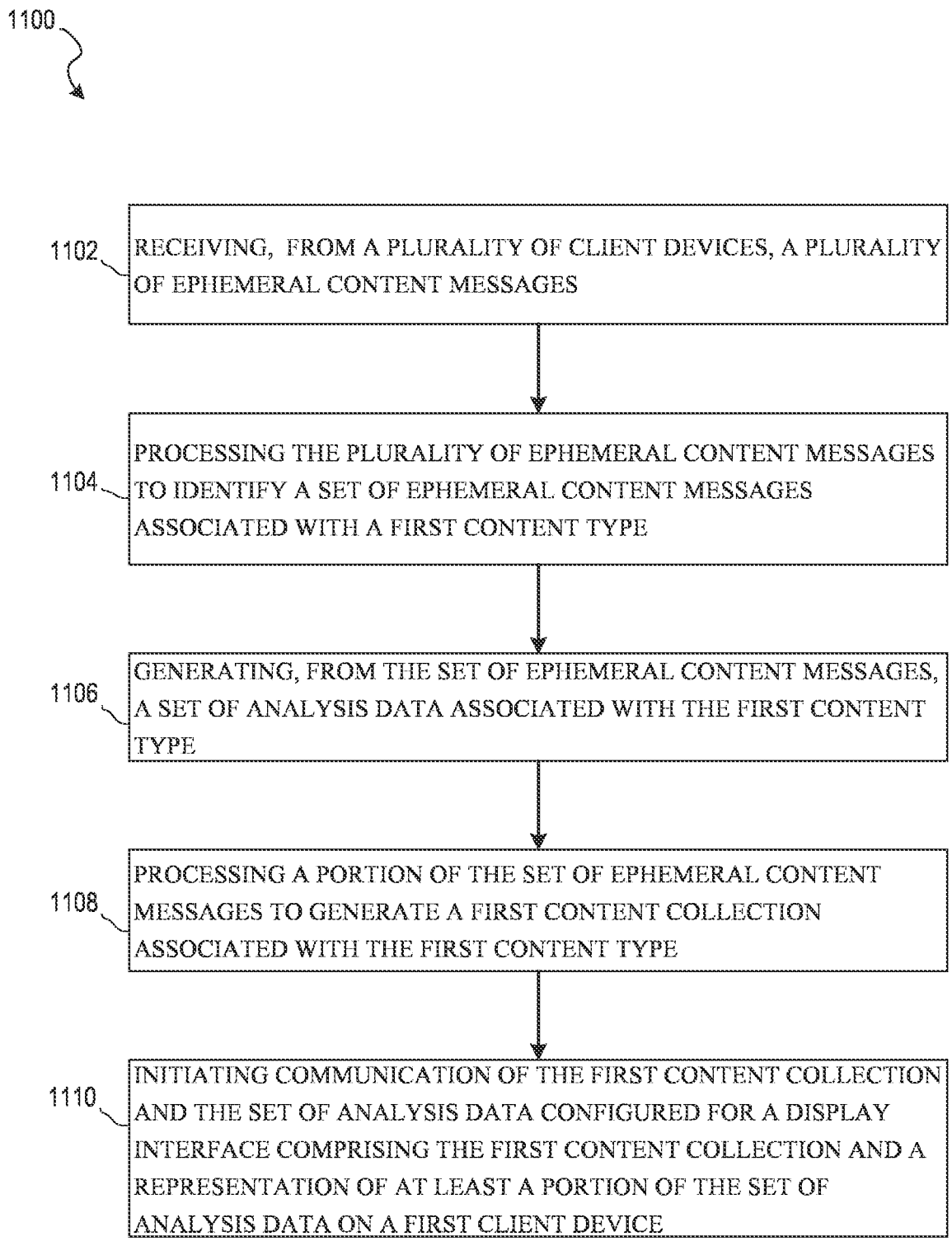
FIG. 11 illustrates a method of automated image processing and insight presentation in accordance with some embodiments.

FIG. 11 is a flowchart describing a method 1100 for automated image processing and insight presentation according to some embodiments. In some embodiments, the method 1100 is performed by a computing device with one or more processors. In some embodiments, the method 1100 is embodied in computer-readable instructions stored in a non-transitory storage device, such that when the instructions are executed by one or more processors of a device, the device performs the method 1100. Other embodiments may be implemented using any acceptable format or instantiation.

Method 1100 begins with operation 1102 receiving, at a server computer from a plurality of client devices, a plurality of ephemeral content messages. In operation 1104, plurality of ephemeral content messages are processed to identify a set of ephemeral content messages associated with a first content type. Operation 1106 then involves generating, from the set of ephemeral content messages using the one or more processors, a set of analysis data associated with the first content type. Operation 1108 can be performed before, after, or concurrently with operation 1106, and after the content types (e.g. including at least a first content type) are assigned in operation 1104. In operation 1108, a portion of the set of ephemeral content messages is processed using the one or more processors to generate a first content collection associated with the first content type. The information from the previous operations is then used in operation 1110 for initiating communication, by the one or more processors, of the first content collection and the set of analysis data configured for a display interface comprising the first content collection and a representation of at least a portion of the set of analysis data on a first client device.

In some embodiments, operations of method 1100 can operate where generating the set of analysis data comprises machine vision processing of the plurality of ephemeral content messages to identify content type values for at least one image of each message of the plurality of ephemeral content messages. In some such embodiments, generating the set of analysis data further involves determining time, location, and source account demographic information for said each message of the plurality of ephemeral content messages, and updating a set of metrics associated with corresponding content types associated with the content type values using the time, location, and source account demographic information. Some such embodiments can further involve operations for restricting access to at least the portion of the set of analysis data based on a determination that a number of client accounts associated with the portion of the set of analysis data is less than a threshold number, where the threshold number is associated with a determination that the demographic information is not sufficiently anonymous if the number of client accounts is less than the threshold number.

In some embodiments of method 1100, processing the portion of the set of ephemeral content messages to generate the first content collection associated with the first content type includes analyzing the portion of the set of ephemeral content messages to generate a quality value of for each piece of content of the portion of the set of ephemeral content messages. In some such embodiments, the quality value for each piece of content is based on an audio quality value and one or more image quality values. Further such embodiments can include operations for determining that a content timer for a first piece of content of the first content collection has expired and removing the first piece of content from the first content collection based on expiration of the content time for the first piece of content. Still further embodiments can include operations for analyzing an updated a set of ephemeral content messages associated with the first content type and updating the first content collection using updated content from the updated set of ephemeral content messages, wherein the updated set of ephemeral messages is generated after expiration of the content timer.

In some embodiments, processing the portion of the set of ephemeral content messages to generate the first content collection associated with the first content type involves presenting content from the plurality of ephemeral content messages associated with the first content type to an administrator via a curation tool and generating the first content collection based on input selections received at the curation tool for the content from the plurality of ephemeral content messages. In some embodiments, the first content type comprises a brand association for a first brand, and wherein the brand association is identified by a logo image for the first brand or text for the first brand.

The operations of method 1100 include processes performed by a networked computing device (e.g. a server computer). Some embodiments involve corresponding operations on a client device, or a client device configured for such corresponding operations and communications with a server computer. For example, one embodiment includes a client device with communication circuitry configured to receive, from a server computer, a content collection associated with a first content type and a set of analysis data associated with the first content type, wherein the content collection and the set of analysis data are generated by the server computer from a plurality of ephemeral messages received from a plurality of client devices not including the client device. The client device also includes a memory coupled to the communication circuitry and configured to store the set of analysis data and the content collection and processing circuitry coupled to the memory and configured to generate a display interface comprising a representation of the set of analysis data and at least a portion of the content collection. The computing device further includes a display configured to output the display interface, wherein the portion of the content collection in the display interface is selectable in the display interface to directly access a content collection interface comprising the content collection.

Further, some embodiments include methods and devices configured to present a user interface for insight presentation using data from automatically processed images. In one such embodiments, a computing device comprises a display screen, with the computing device being configured to present on the display screen a display interface comprising a representation of a set of analysis data associated with a first content type, the set of analysis data generated from a plurality of ephemeral content messages received from a plurality of client devices. In some such embodiments, the computing device is additionally configured to display on the display screen a portion of a content collection representative of the first content type, wherein a content collection interface comprising the content collection is directly accessible from the display interface by a selection on the display interface.

Various embodiments described above improve the operation of a client computing device by reducing the operations to present data to a user, particularly in the context of a small screen. Some embodiments additionally improve the operation of an ephemeral message computing system by reducing the computing resources to present information to users on content available within the system. This includes both current information which is subject to an ephemeral content timer, as well as anonymized information created from past information that has been removed from the system due to expiration of content timers for expired ephemeral content. Such systems further improve the operation of devices in such a messaging system by protecting user privacy while providing increased amounts of information on how the system is used.

While embodiments described above include operations presented in a particular order, it will be apparent that intervening or repeated operations can occur in various different implementations. Additionally, operations on different computing devices, including client devices and networked server computers can individually perform the operations needed to enable the described operations on another device. This includes both operations for presentation and function of user interfaces on different devices, as well as operations performed by processors on different devices.

Figure 12A:
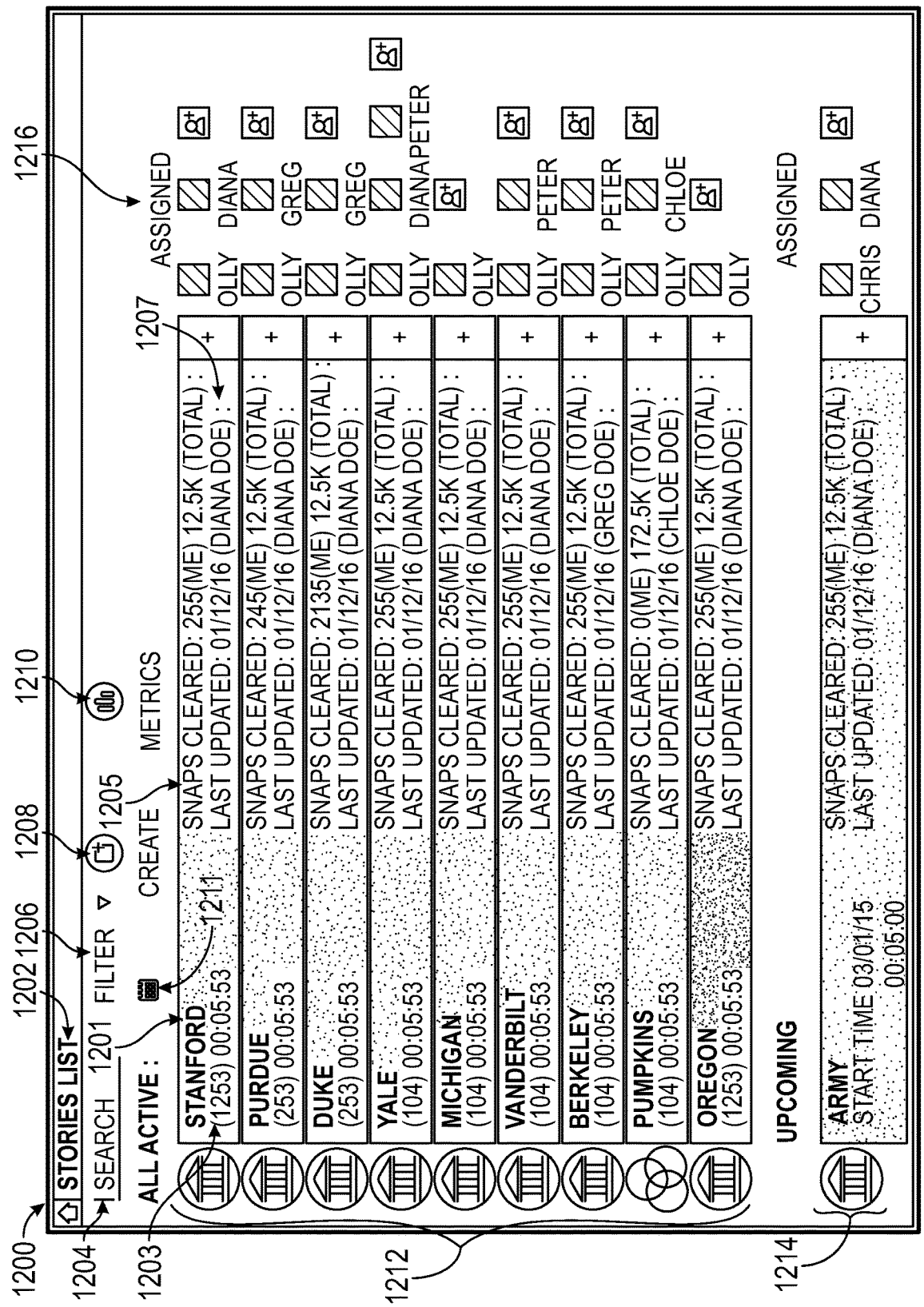

An example user interface is shown in FIG. 12A. The example user interface can display a list of content collections (e.g., stories list 1202). The user interface 1200 may allow an operator to search for a particular content collection, by providing an area 1204 for an operator to enter search criteria. For example, the operator may enter a content collection identifier, a content collection name, keywords, etc. The user interface 1200 also provides a mechanism 1206 to filter the results/list of content collections by various criteria. For example, an operator may filter the content collections by location, campus, event, time zone, live event, etc.

The list of content collections can, in some embodiments, include collections for different content topics (e.g. content types). Some embodiments can include a list of all active content collections 1212 and a list of upcoming content collections 1214. Each list may include an indication of what operators or curators 1216 are assigned to each content collection. There may be one or more operators assigned to each content collection. The user interface 1200 also allows the operator to add or remove operators for each content collection. Each content collection may have a title 1201, a number of content items or content messages 1203 that are in the queue for that content collection, a number of content items that have been cleared 1205 (viewed, reviewed, etc.), and the last time the content collection was updated 1207. Upcoming content collections 1214 may also include information about when they are scheduled to be made available to users.

The content collections may also indicate a status by an indicator such as color or other method. For example, content collections that do not need immediate attention may have a first indicator (e.g., a green color), content collections that need attention may have a second indicator (e.g., a red color), and content collections that are incomplete (e.g., do not have a geofence, need approval, do not have a thumbnail, etc.) may have a third indicator (e.g., a yellow color). The server system may set or update a status indicator based on a predetermined trigger. An operator may select any of the content collections to go to a detailed view for a particular content collection.

Figure 12B:
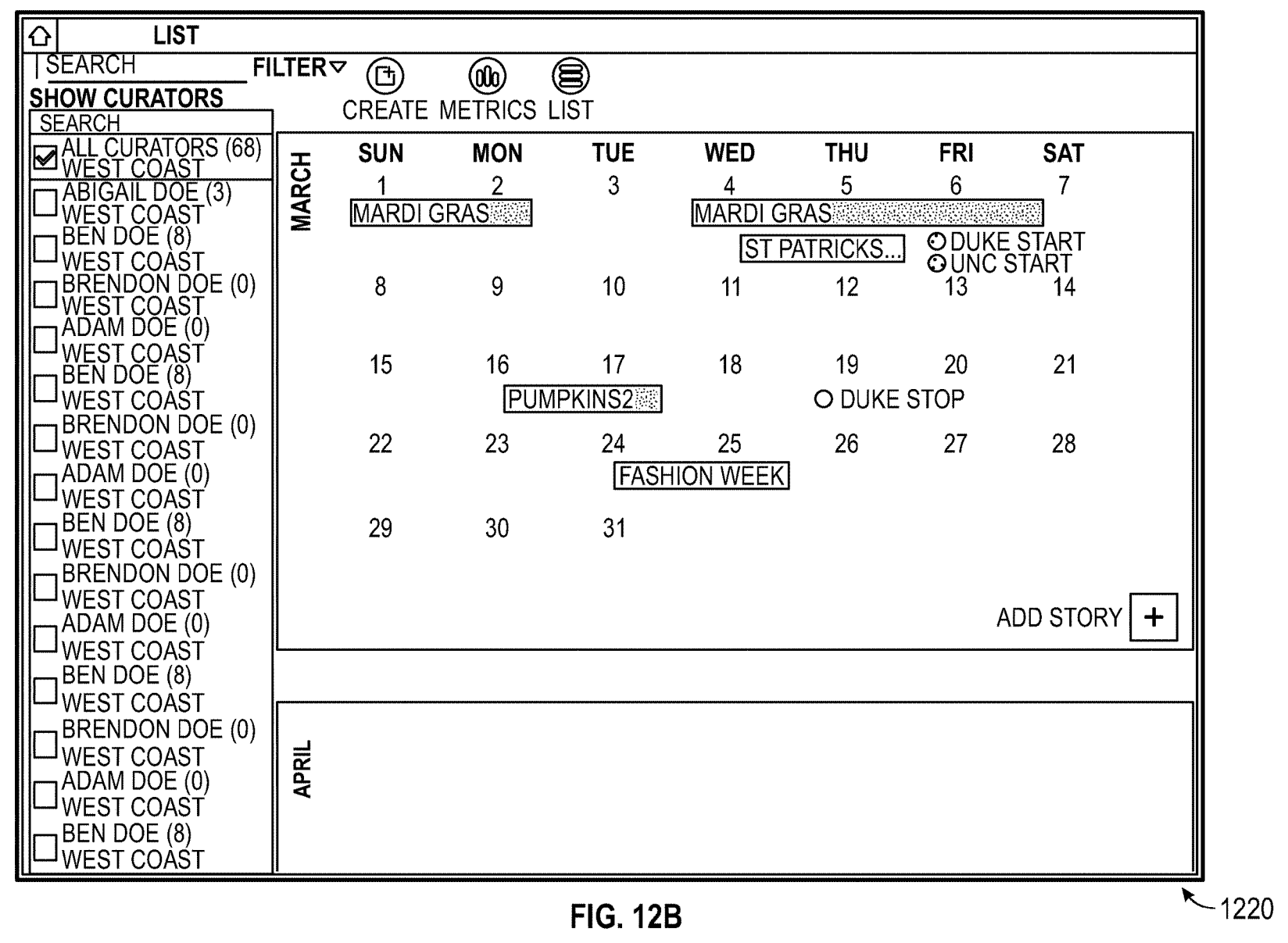

The user interface 1200 may also provide a mechanism 1210 for the operator to view metrics associated with one or more content collections, one or more operators, etc. And the user interface 1200 may also provide a mechanism 1211 for accessing a calendar view of the content collections. A calendar view of the content collections is shown in FIG. 12B. In the calendar view 1220, an operator may see live content collections laid out in a monthly view.

Figure 12C:
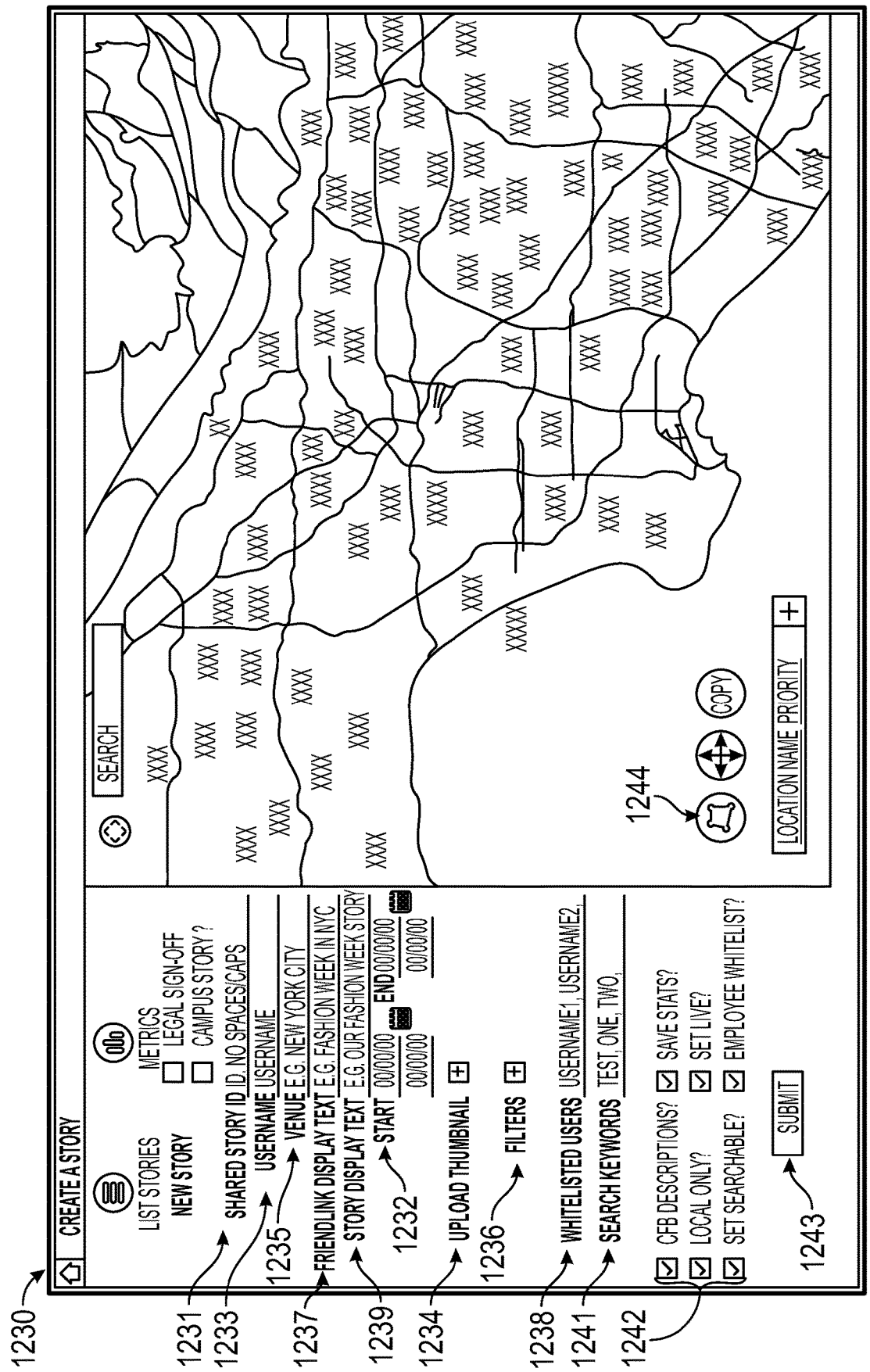
Figure 12D:
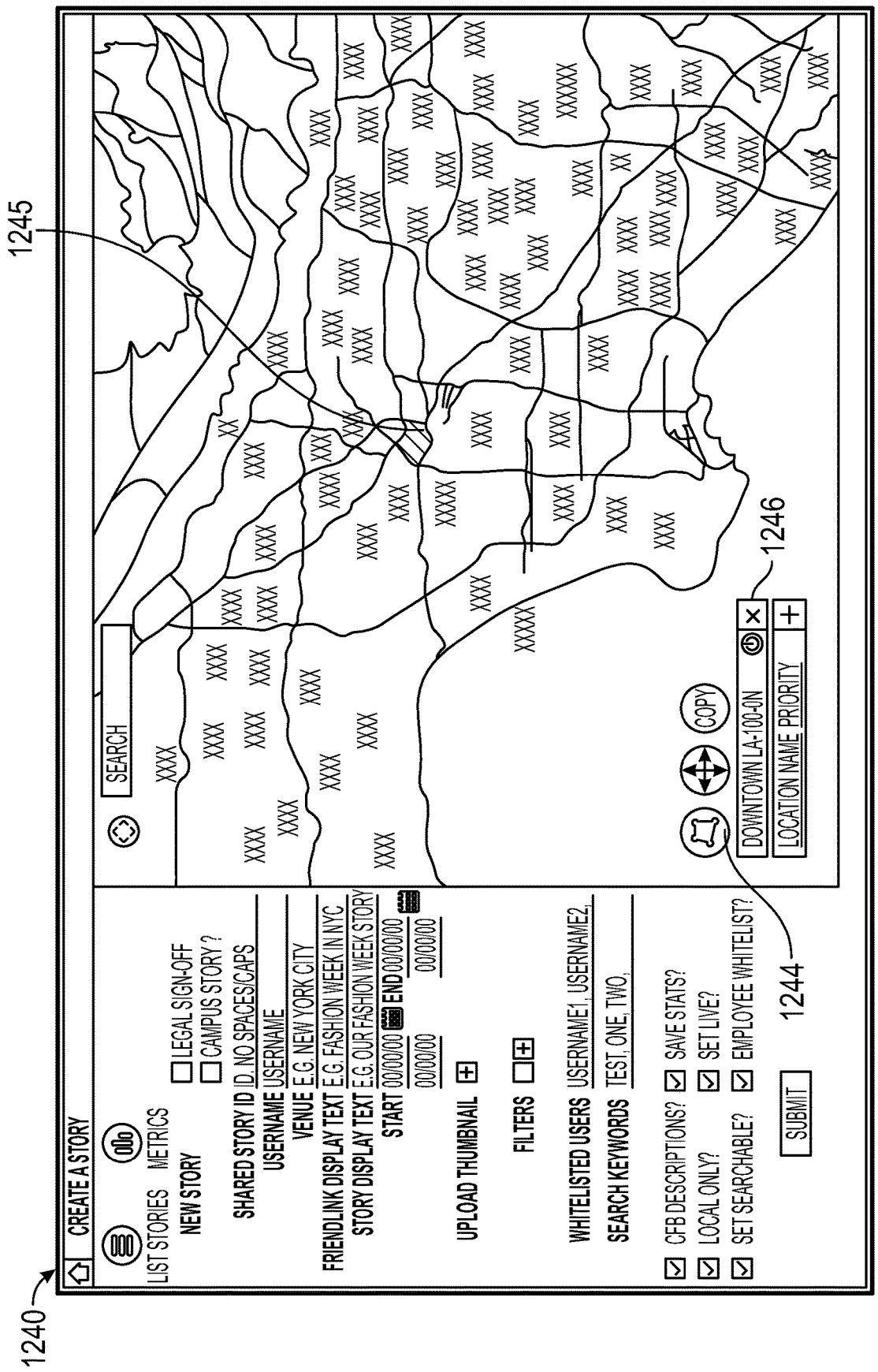
Figure 12E:
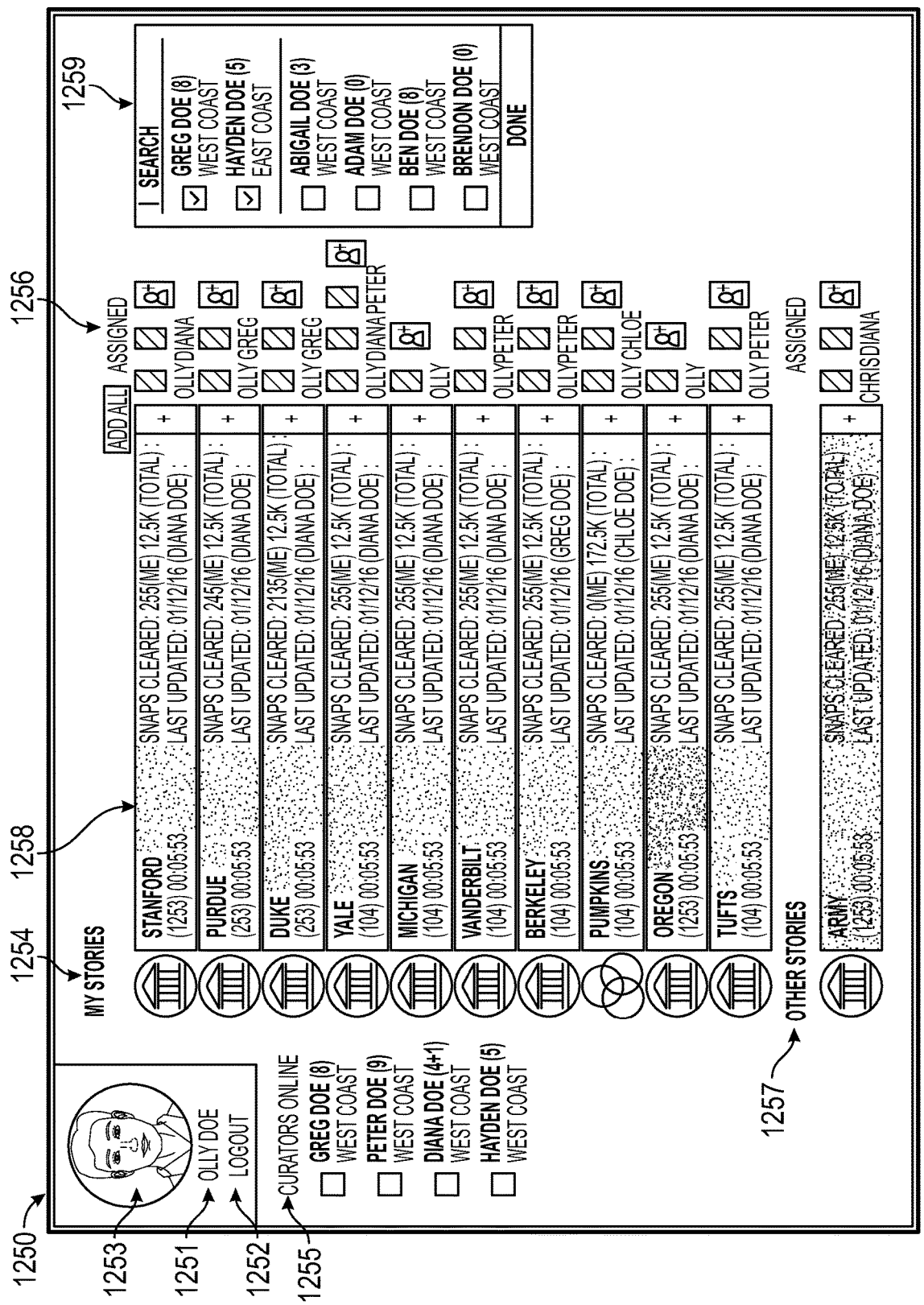

An operator may also view a list of just the content collections assigned to the operator, as shown displayed in example interface 1250 in FIG. 12E. The interface 1250 may display the name 1251 of the operator, a logout button 1252, a picture 1253 of the operator, a list of the content collections 1254 that the operator is currently working on, a list 1255 of other operators that are currently online (e.g., working on content collections), what operators are working on each content collection 1256, and other content collections 1257.

Each content collection list item (e.g., content collection list item 1258) may include information about the content collection. For example, the content collection list item may include a name of the content collection (e.g., Stanford, Purdue, etc.), a number of content items or content messages in the queue for that content collection (e.g., 1253, 1253, etc.), a time since the last update was pushed live or content items or content messages were added to the queue (e.g., 00:05:53), the amount of content items or content messages cleared or reviewed/curated (e.g., an amount for the operator (e.g., 1255, 1245, 1235 etc.), and a total amount (e.g., 12.5 k, 172.5 k, etc.), and a last updated time stamp and by whom it was updated (e.g., 01/12/16 (D. Boone)). The operator may also be able to add an operator to a content collection, for example, using a drop down box 1259 as shown in example interface 1250.

Figure 12F:
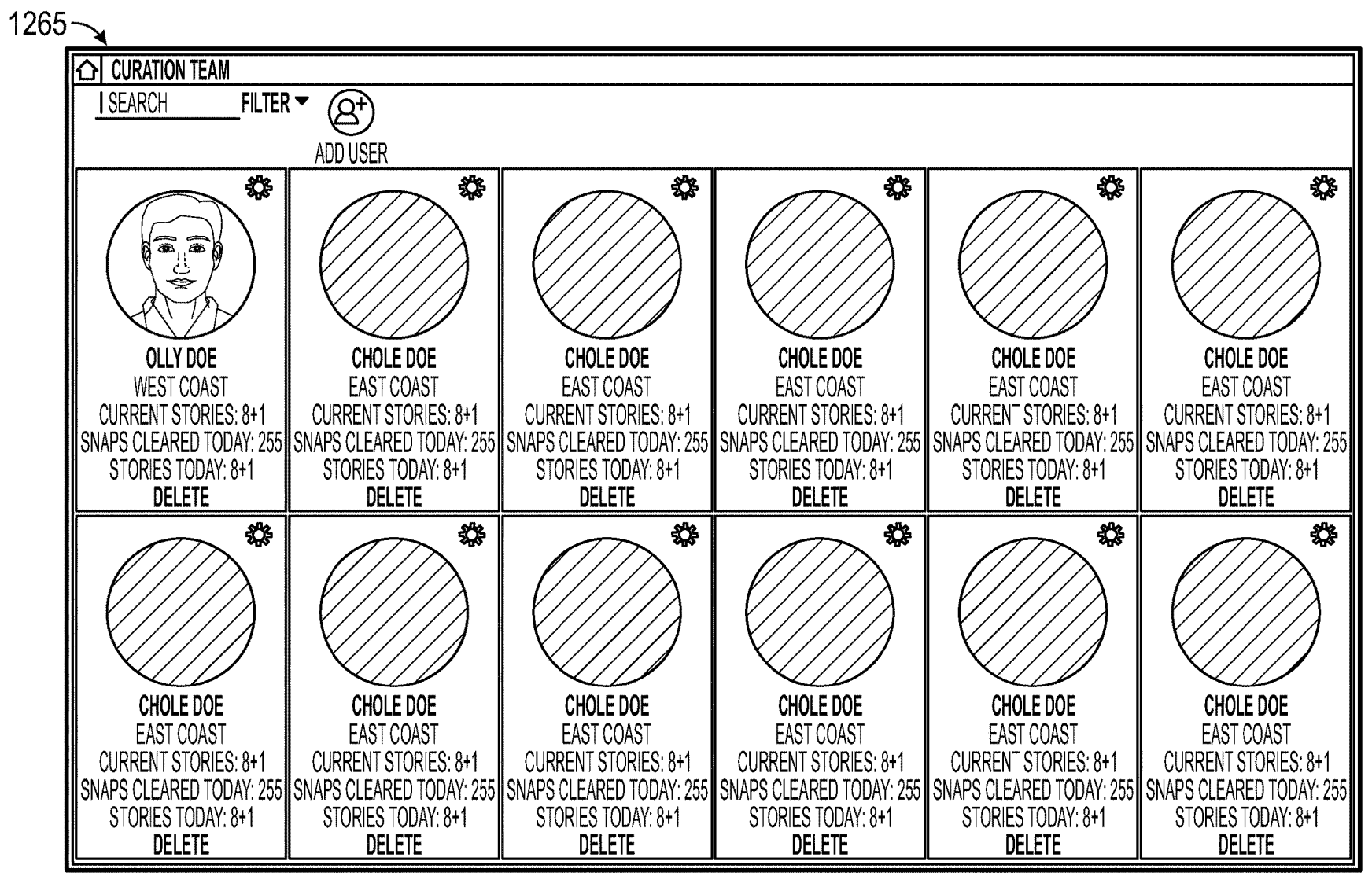
Figure 12H:
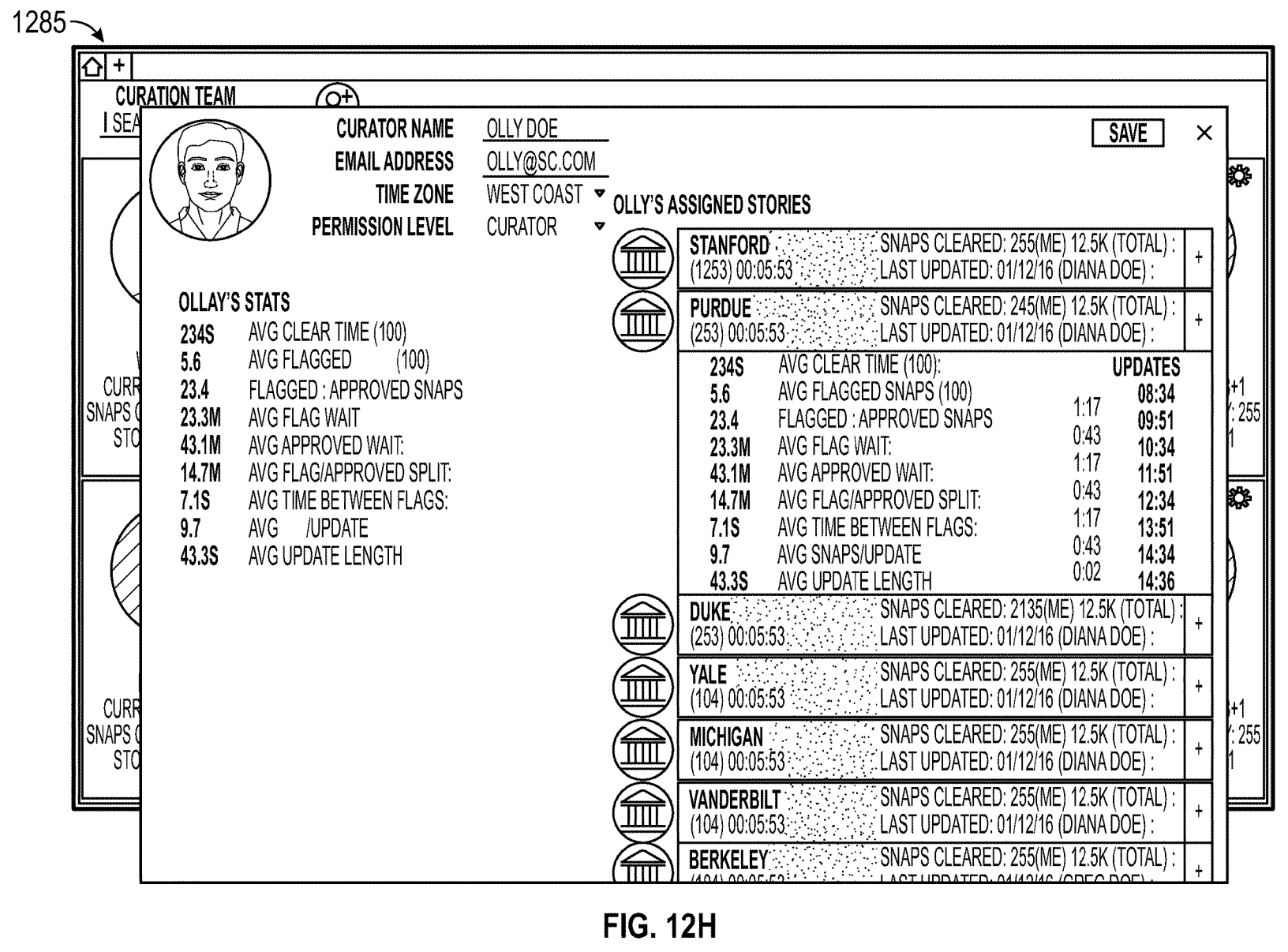

The operator may be further provided with a mechanism to view all operators currently working on content collections, as shown in interface 1265 of FIG. 12F. The interface 1265 may provide a photograph of the operator, a location of the operator (e.g., west coast, east coast, etc.), a number of content collections the operator is working on, the number of content items or content messages cleared or reviewed/curated for the day, content collections worked on for the day, etc. The operator may view further details for each operator as shown in interface 1275 in FIG. 12G. For example, interface 1275 may include various metrics for the operator, such as average time it takes to clear 100 content items or content messages, average number of flagged (e.g., selected) content items or content messages per 100 content items or content messages, ratio of flagged to approved content items or content messages, average time a flagged content item or content message has been in the queue before it is flagged, average time an approved content item or content message has been in the queue before it is activated, average time it takes for an approved content item or content message to go from flagged to approved, average time between flagging two separate content items or content messages, average length of each updated number of content items or content messages per update, number of content collection seconds per update, etc. The operator may also be able to view metrics specific to a content collection (with similar metrics as described above), as shown in interface 1285 of FIG. 12H.

The operator may further be provided with a mechanism to create a new content collection (e.g., via a selectable "create story" icon 1208 as shown in FIGS. 12A and 12B). A user interface 1230 such as the one shown in FIG. 12C may be provided to the operator to create a new content collection. The user interface 1230 may allow the operator to input various information related to the new story or content collection. For example, the operator may input a content collection identifier (ID) 1231, username 1233, location or venue 1235 (e.g., city, state/country, various locations, etc.), friendlink display text 1237 (e.g., "Fashion Week in NYC"), content collection display text 1239 (e.g., "Our Fashion Week Story"), a start time and end time 1232 (e.g., when the collection fence will open and close). The operator may also be able to input a type of content collection (not shown). Some examples of types of content collections may be worldwide (e.g., appears to every user, public local (e.g., appears to local users and other outputs), private local (e.g., only appears to local users), employee whitelist (e.g., only appears to employees such as an operator or curator for a particular content collection).

The operator may also be able to upload a thumbnail 1234 that may be associated with the content collection and displayed in various media output displays (e.g., apps, websites, etc.). The thumbnail options can be curated by machine learning to provide options which represent a content topic or content type associated with a representative content collection and an insight presentation interface. The operator can then choose from a selection of predetermined thumbnails or create a new thumbnail. The operator may also select or add filters 1236 and/or intro animations to be associated with the content collection. The operator may also include whitelisted users 1238 and search for keywords 1241 to be associated with the content collection. There may be additional information 1242 that may be selected by the operator. For example, if the operator has selected public local or private local for the content collection type, a check box may appear that can be selected to indicate that a collection fence is different from a broadcast fence. If the operator selects this option (e.g., checks this box), then the operator may be prompted to draw more than one geofence. Other additional information 1242 may include an option to show the content collection on a website, show the content collection in a search or media forum (e.g., Google Now, Google search, etc.), and show content collections in a browser. If the operator selects to show the content collection in one of these options, the operator may be prompted to input additional information such as a description of the content collection (e.g., text box to input a description of the content collection), color for the content collection, etc.

The operator may also be able to draw a geofence (e.g., a virtual fence over a geographic area) on a map to associate a particular location with the content collection. For example, the operator may select a geofence drawing button 1244 and then create a polygon 1245 to indicate the location to associate with the content collection, as shown in user interface 1240 of FIG. 12D. After drawing the polygon 1245, the operator may be able to name and prioritize the geofence and then finalize it. An indication of the geofence 1246 may be displayed to the operator. Additional geofences may be created by the operator, if desired. A content collection may have more than one geofence associated with the content collection. A geofence may be deleted by selecting the geofence and indicating it should be deleted (e.g., pressing a particular button). The operator may also move the geofence around on the map to another location, or copy and paste the geofence to another location. A geofence may be used, for example, to determine eligibility of a user to submit a content item or content message for a particular content collection. For example, if a user is determined to be within the geofence for the content collection, the user may be eligible to submit content items or content messages for that content collection.

After the operator finishes entering information to create the new content collection, the operator may submit the information. For example, the operator may select a submit option 1243 and the operator device may send a request to create a new content collection with the information to a server system 108. Server system 108 may receive and evaluate the request and information and create a new content collection and store the associated information in one or more databases 120. The server system may generate a message indicating a new content collection has been created and send it to one or more operator devices.

Software Architecture

Figure 13:
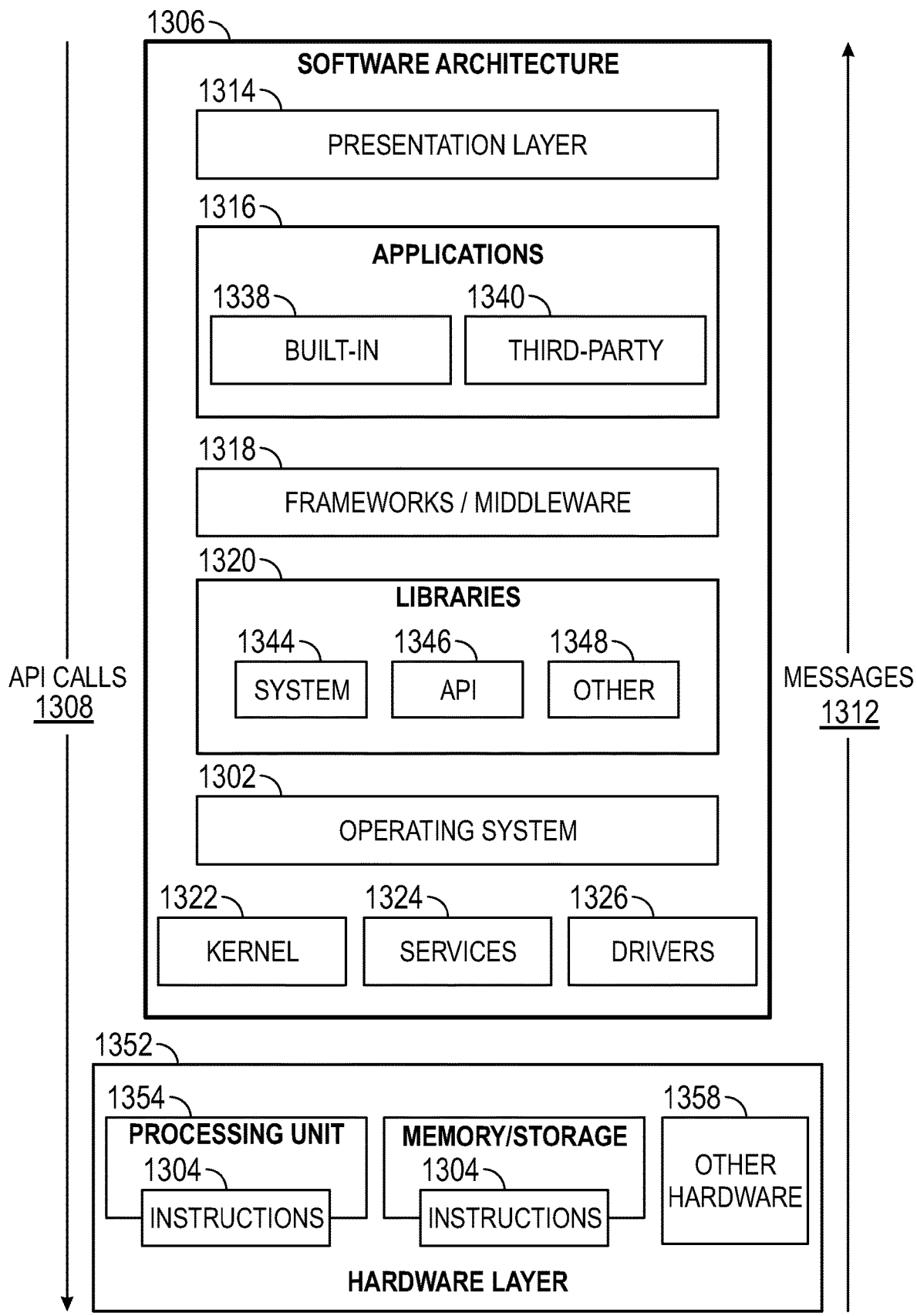
FIG. 13 is a block diagram illustrating a representative software architecture, which may be used in conjunction with various hardware architectures herein described and used to implement various embodiments.

FIG. 13 is a block diagram illustrating an example software architecture 1306, which may be used in conjunction with various hardware architectures herein described. FIG. 13 is a non-limiting example of a software architecture 1306 and it will be appreciated that many other architectures may be implemented to facilitate the functionality described herein. The software architecture 1306 may execute on hardware such as machine 1400 of FIG. 14 that includes, among other things, processors 1404 (e.g. including processor 1408 and processor 1412), memory 1414, and I/O components 1418. A representative hardware layer 1352 is illustrated and can represent, for example, the machine 1400 of FIG. 14. The representative hardware layer 1352 includes a processing unit 1354 having associated executable instructions 1304. Executable instructions 1304 represent the executable instructions of the software architecture 1306, including implementation of the methods, components and so forth described herein. The hardware layer 1352 also includes memory and/or storage modules memory/storage 1356, which also have executable instructions 1304. The hardware layer 1352 may also comprise other hardware 1358.

In the example architecture of FIG. 13, the software architecture 1306 may be conceptualized as a stack of layers where each layer provides particular functionality. For example, the software architecture 1306 may include layers such as an operating system 1302, libraries 1320, applications 1316 and a presentation layer 1314. Operationally, the applications 1316 and/or other components within the layers may invoke application programming interface (API) API calls 1308 through the software stack and receive messages 1312 in response to the API calls 1308. The layers illustrated are representative in nature and not all software architectures have all layers. For example, some mobile or special purpose operating systems may not provide a frameworks/middleware 1318, while others may provide such a layer. Other software architectures may include additional or different layers.

The operating system 1302 may manage hardware resources and provide common services. The operating system 1302 may include, for example, a kernel 1322, services 1324 and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than to interface directly with the underlying operating system 1302 functionality (e.g., kernel 1322, services 1324 and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 (also sometimes referred to as middleware) provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. Third-party applications 1340 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems.

The third-party applications 1340 may invoke the API calls 1308 provided by the mobile operating system (such as operating system 1302) to facilitate functionality described herein.

The applications 1316 may use built in operating system functions (e.g., kernel 1322, services 1324 and/or drivers 1326), libraries 1320, and frameworks/middleware 1318 to create user interfaces to interact with users of the system. Alternatively, or additionally, in some systems interactions with a user may occur through a presentation layer, such as presentation layer 1314. In these systems, the application/component "logic" can be separated from the aspects of the application/component that interact with a user.

Figure 14:
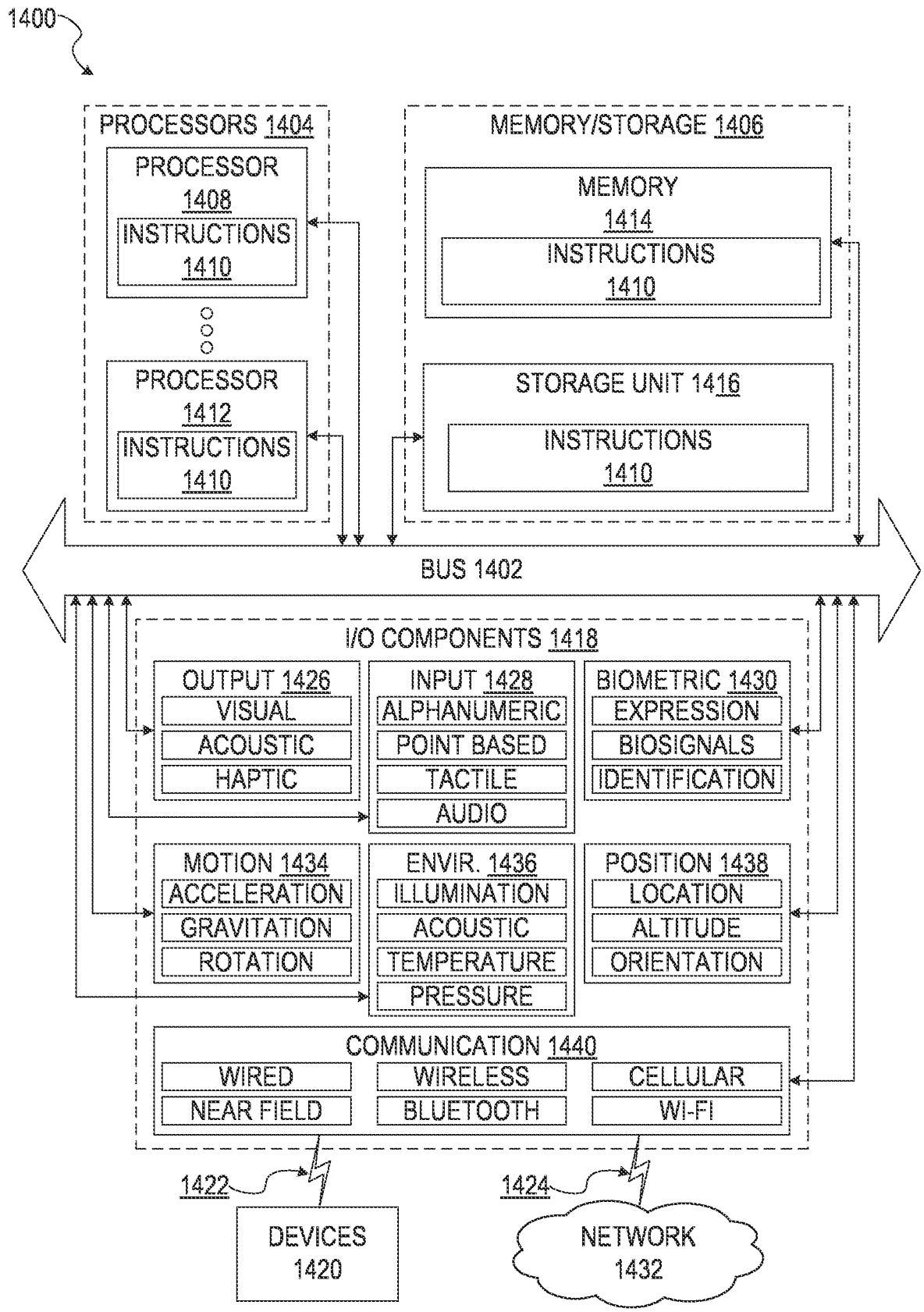
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory memory/storage 1406, and I/O components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of processors 1404 are examples of machine-readable media.

The I/O components 1418 may include a wide variety of components to receive input, provide output, produce output, transmit information, exchange information, capture measurements, and so on. The specific I/O components 1418 that are included in a particular machine 1400 will depend on the type of machine. For example, portable machines such as mobile phones will likely include a touch input device or other such input mechanisms, while a headless server machine will likely not include such a touch input device. It will be appreciated that the/O components 1418 may include many other components that are not shown in FIG. 14. The I/O components 1418 are grouped according to functionality merely for simplifying the following discussion and the grouping is in no way limiting. In various example embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environment components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via coupling 1422 and coupling 1424 respectively. For example, the communication components 1440 may include a network interface component or other suitable device to interface with the network 1432. In further examples, communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a Universal Serial Bus (USB)).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geo-location, location via Wi-Fi® signal triangulation, location via detecting a NFC beacon signal that may indicate a particular location, and so forth.

"CONTENT", as described herein, refers to one or more images or video clips captured by an electronic device, as well as any associated metadata descriptions and graphics or animation added to the image or video clip. This includes metadata generated by an electronic device capturing an image or video, as well as metadata that may be associated later by other devices. A "piece of content" refers to an individual image or video clip captured by a client device with any changes made to the image or video clip (e.g. transformations, filters, added text, etc.). Individual pieces of content may have multimedia elements, including drawings, text, animations, emoji, or other such elements added along with image or video clip elements. Content captured by an image sensor of a client device may be sent, along with any added multimedia elements from a user, via a network to other client devices as part of a social sharing network. Individual pieces of content may have time limits or associated display times, which are within a display threshold set by a system. For example, an embodiment system may limit video clips to 10 seconds or less, and may allow users to select display times less than 10 seconds for image content.

A "CONTENT MESSAGE" as referred to herein refers to the communication of content between one or more users via the system. Content may also be sent from a client device to a server system to be shared generally with other system users. Some embodiments limit content messages to images or video clips captured using an interface that does not allow the content to be stored and sent later, but instead uses an associated content message with a single piece of content and any added multimedia to be sent before any other action is taken on the device. Embodiments described herein relate to methods of grouping such content into content collections (e.g., stories.) In various systems, content messages may be sent from one individual user to another individual user, as, for example, an ephemeral message in addition to the ability to send content messages to a server computer system for inclusion in various content collections.

A "CONTENT COLLECTION" as described herein is an ordered set of content. The individual pieces of content that make up a particular content collection may be related in a variety of different ways. For example, in some embodiments, a content collection includes all pieces of content marked as public that are sent to a server system from a particular user within a certain time frame (e.g., within the past 24 hours). Access to such a content collection can be limited to certain other users (e.g., friends) identified by the user that generates the content for the collection. In some other embodiments, content collections include pieces of content from different users that are related by time, location, content, or other metadata. In some embodiments, content collections are referred to as stories. A story or content collection may be generated from pieces of content that are related in a variety of different ways, as is described in more detail throughout this document.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory, even if the message is temporarily stored in a non-transitory computer readable medium.

"MACHINE-READABLE MEDIUM" or "NON-TRANSITORY COMPUTER READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   machine vision processing of a plurality of ephemeral content messages to identify content type values for at least one image of each message of the plurality of ephemeral content messages;
   determining account demographic information for each message of the plurality of ephemeral content messages;
   updating a set of metrics associated with corresponding content types associated with the content type values using the account demographic information; and
   restricting access to at least a portion of a set of analysis data based on a determination that a number of client accounts associated with the portion of the set of analysis data is less than a threshold number, where the threshold number is associated with a determination that the demographic information is not sufficiently anonymous if the number of client accounts is less than the threshold number.

2. The method of claim 1, further comprising:
   receiving, at a server from a plurality of client devices, the plurality of ephemeral content messages;
   processing, by the server, the plurality of ephemeral content messages to identify a set of ephemeral content messages associated with a first content type;
   generating, from the set of ephemeral content messages, a set of analysis data associated with the first content type;
   processing a portion of the set of ephemeral content messages to generate a first content collection associated with the first content type; and
   initiating communication of the first content collection and the set of analysis data configured for a display interface comprising the first content collection and a representation of at least a portion of the set of analysis data on a first client device.

3. The method of claim 1, further comprising:
   determining time and location for each message of the plurality of ephemeral content messages.

4. The method of claim 1, further comprising processing a portion of the set of ephemeral content messages to generate a first content collection associated with a first content type by analyzing the portion of the set of ephemeral content messages to generate a quality value of for each piece of content of the portion of the set of ephemeral content messages.

5. The method of claim 4, wherein the quality value for each piece of content is based on an audio quality value and one or more image quality values.

6. The method of claim 5, further comprising:
   determining that a content timer for a first piece of content of the first content collection has expired; and
   removing the first piece of content from the first content collection based on expiration of the content timer for the first piece of content.

7. The method of claim 6, further comprising:
   analyzing an updated a set of ephemeral content messages associated with the first content type; and
   updating the first content collection using updated content from the updated set of ephemeral content messages, wherein the updated set of ephemeral messages is generated after expiration of the content timer.

8. The method of claim 1, further comprising:
   processing the portion of the set of ephemeral content messages to generate a first content collection associated with a first content type by presenting content from the plurality of ephemeral content messages associated with the first content type to an administrator via a curation tool; and
   generating the first content collection based on input selections received at the curation tool for the content from the plurality of ephemeral content messages.

9. The method of claim 1, wherein a first content type comprises a brand association for a first brand, and wherein the brand association is identified by a logo image for the first brand or text for the first brand.

10. A system comprising:
    one or more processors configured to perform operations comprising:
    machine vision processing of a plurality of ephemeral content messages to identify content type values for at least one image of each message of the plurality of ephemeral content messages;
    determining account demographic information for each message of the plurality of ephemeral content messages;
    updating a set of metrics associated with corresponding content types associated with the content type values using the account demographic information; and
    restricting access to at least a portion of a set of analysis data based on a determination that a number of client accounts associated with the portion of the set of analysis data is less than a threshold number, where the threshold number is associated with a determination that the demographic information is not sufficiently anonymous if the number of client accounts is less than the threshold number.

11. The system of claim 10, the operations further comprising:
receiving, at a server from a plurality of client devices, the plurality of ephemeral content messages;
processing, by the server, the plurality of ephemeral content messages to identify a set of ephemeral content messages associated with a first content type;
generating, from the set of ephemeral content messages, a set of analysis data associated with the first content type;
processing a portion of the set of ephemeral content messages to generate a first content collection associated with the first content type; and
initiating communication of the first content collection and the set of analysis data configured for a display interface comprising the first content collection and a representation of at least a portion of the set of analysis data on a first client device.

12. The system of claim 10, the operations further comprising:
determining time and location for each message of the plurality of ephemeral content messages.

13. The system of claim 10, the operations further comprising processing a portion of the set of ephemeral content messages to generate a first content collection associated with a first content type by analyzing the portion of the set of ephemeral content messages to generate a quality value of for each piece of content of the portion of the set of ephemeral content messages.

14. The system of claim 13, wherein the quality value for each piece of content is based on an audio quality value and one or more image quality values.

15. The system of claim 10, the operations comprising processing a portion of the set of ephemeral content messages to generate a first content collection associated with a first content type comprises analyzing the portion of the set of ephemeral content messages to generate a quality value of for each piece of content of the portion of the set of ephemeral content messages; and wherein the quality value for each piece of content is based on an audio quality value and one or more image quality values.

16. The system of claim 15, the operations comprising:
determining that a content timer for a first piece of content of the first content collection has expired;
removing the first piece of content from the first content collection based on expiration of the content timer for the first piece of content;
analyzing an updated a set of ephemeral content messages associated with the first content type;
updating the first content collection using updated content from the updated set of ephemeral content messages, wherein the updated set of ephemeral messages is generated in response to expiration of the content timer.

17. A non-transitory computer readable medium comprising instructions that, when executed by one or more processors of a server computer, cause the server computer to perform operations comprising:
machine vision processing of a plurality of ephemeral content messages to identify content type values for at least one image of each message of the plurality of ephemeral content messages;
determining account demographic information for each message of the plurality of ephemeral content messages;
updating a set of metrics associated with corresponding content types associated with the content type values using the account demographic information; and
restricting access to at least a portion of a set of analysis data based on a determination that a number of client accounts associated with the portion of the set of analysis data is less than a threshold number, where the threshold number is associated with a determination that the demographic information is not sufficiently anonymous if the number of client accounts is less than the threshold number.

18. The non-transitory computer readable medium of claim 17, wherein processing the portion of the set of ephemeral content messages to generate a first content collection associated with a first content type comprises:
presenting content from the plurality of ephemeral content messages associated with the first content type to an administrator via a curation tool;
generating the first content collection based on input selections received at the curation tool for the content from the plurality of ephemeral content messages; and
wherein the first content type comprises a brand association for a first brand, and wherein the brand association is identified by a logo image for the first brand.

19. The non-transitory computer readable medium of claim 17, the operations comprising processing the portion of the set of ephemeral content messages to generate a first content collection associated with a first content type comprises analyzing the portion of the set of ephemeral content messages to generate a quality value of for each piece of content of the portion of the set of ephemeral content messages; and
wherein the quality value for each piece of content is based on an audio quality value and one or more image quality values.

20. The non-transitory computer readable medium of claim 19, the operations comprising:
determining that a content timer for a first piece of content of the first content collection has expired;
removing the first piece of content from the first content collection based on expiration of the content timer for the first piece of content;
analyzing an updated a set of ephemeral content messages associated with the first content type;
updating the first content collection using updated content from the updated set of ephemeral content messages, wherein the updated set of ephemeral messages is generated in response to expiration of the content timer.

* * * * *